United States Patent
Yin et al.

(10) Patent No.: US 11,515,711 B2
(45) Date of Patent: Nov. 29, 2022

(54) GRID INTERCONNECTION DEVICE AND SERVER

(71) Applicant: FUJI ELECTRIC CO., LTD., Kanagawa (JP)

(72) Inventors: Songhao Yin, Hino (JP); Takayuki Nagakura, Yokohama (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 17/356,578

(22) Filed: Jun. 24, 2021

(65) Prior Publication Data
US 2021/0320502 A1    Oct. 14, 2021

Related U.S. Application Data

(63) Continuation of application No. PCT/JP2020/026573, filed on Jul. 7, 2020.

(30) Foreign Application Priority Data

Jul. 9, 2019 (JP) .............................. JP2019-127382

(51) Int. Cl.
*H02J 3/46* (2006.01)
*H02J 3/38* (2006.01)
(Continued)

(52) U.S. Cl.
CPC .................. *H02J 3/46* (2013.01); *G06F 1/28* (2013.01); *H02J 3/16* (2013.01); *H02J 3/381* (2013.01);
(Continued)

(58) Field of Classification Search
CPC ...... H02J 3/46; H02J 3/16; H02J 3/381; H02J 3/38; H02J 2300/24; H02J 2300/30; H02J 2203/10; G06F 1/28
See application file for complete search history.

(56) References Cited

U.S. PATENT DOCUMENTS

| 2013/0215652 | A1 | 8/2013 | Komatsu |
| 2016/0118803 | A1 | 4/2016 | Takahashi |

FOREIGN PATENT DOCUMENTS

| JP | 2004274812 A | 9/2004 |
| JP | 2006081286 A | 3/2006 |
| JP | 2009159754 A | 7/2009 |

(Continued)

OTHER PUBLICATIONS

International Search Report and (ISA/237) Written Opinion of the International Search Authority for International Patent Application No. PCT/JP2020/026573, mailed by the Japan Patent Office dated Aug. 18, 2020.

(Continued)

*Primary Examiner* — Robert L Deberadinis

(57) ABSTRACT

It is desirable to improve the accuracy of voltage control in the grid interconnection device for supplying the power generated by the distributed power source to the interconnection point. Provided is a grid interconnection device for supplying power generated by a distributed power source to an interconnection point, comprising: a calculation unit for calculating voltage at the interconnection point based on output voltage of the grid interconnection device, output current of the grid interconnection device, and an impedance component between the grid interconnection device and the interconnection point; and a control unit for controlling output power from the grid interconnection device, based on voltage at the interconnection point calculated by the calculation unit.

25 Claims, 16 Drawing Sheets

(51) Int. Cl.
  *G06F 1/28* (2006.01)
  *H02J 3/16* (2006.01)
(52) U.S. Cl.
  CPC ....... *H02J 2203/10* (2020.01); *H02J 2300/24* (2020.01); *H02J 2300/30* (2020.01)

(56) References Cited

FOREIGN PATENT DOCUMENTS

| | | | |
|---|---|---|---|
| JP | 2013099132 | A | 5/2013 |
| JP | 2015039262 | A | 2/2015 |
| JP | 2015192529 | A | 11/2015 |
| JP | 2016082741 | A | 5/2016 |
| JP | 6510741 | B1 | 5/2019 |
| JP | 6537761 | B1 | 7/2019 |
| WO | 2012039034 | A1 | 3/2012 |

OTHER PUBLICATIONS

SunSpec Alliance, SunSpec Information Model Reference, Date Generated: Oct. 17, 2016.
Office Action issued for counterpart Japanese Application No. 2019-127382, issued by the Japanese Patent Office dated Jan. 7, 2020 (drafted on Dec. 24, 2019).

GRID INTERCONNECTION DEVICE AND SERVER

The contents of the following Japanese patent applications are incorporated herein by reference:
No. 2019-127382 filed in JP on Jul. 9, 2019, and
No. PCT/JP2020/026573 filed in WO on Jul. 7, 2020

BACKGROUND

1. Technical Field

The present invention relates to a grid interconnection device and server.

In a power grid in which a large number of distributed power sources such as photovoltaic power generation devices are interconnected, if the voltage management value deviates, a configuration is proposed for selecting a corresponding grid control device and a distributed power source, and calculating each control value. (For example, refer to Patent Document 1).

Prior Art Document

[Patent Document]
Patent Document 1: Japanese Patent Application Publication No. 2004-274812.

2. Technical Problem

It is desirable to improve the accuracy of voltage control in the grid interconnection device for supplying the power generated by the distributed power source to the interconnection point.

GENERAL DISCLOSURE

A first aspect of the present invention provides a grid interconnection device. The grid interconnection device may supply power generated by a distributed power source to an interconnection point. The grid interconnection device may include a calculation unit and a control unit. The calculation unit may calculate voltage at the interconnection point based on output voltage of the grid interconnection device, output current of the grid interconnection device, and an impedance component. The impedance component may be an impedance component between the grid interconnection device and the interconnection point. The control unit may control output power from the grid interconnection device based on the voltage at the interconnection point, which is calculated by the calculation unit.

The impedance component may include an impedance component of the transformer provided between the grid interconnection device and the interconnection point.

The control unit may control the reactive power output from the grid interconnection device.

The control unit may adjust the output voltage by controlling the reactive power output from the grid interconnection device.

The calculation unit may detect the output voltage of the grid interconnection device, the output current of the grid interconnection device for each control cycle, and calculate the offset voltage between the voltage at the interconnection point and the output voltage of the grid interconnection device. The calculation unit may calculate the offset voltage between the voltage at the interconnection point that is a point where a plurality of distributed power sources are connected and the output voltage of the grid interconnection device. The calculation unit may detect the output voltage of the grid interconnection device, the output current of the grid interconnection device for each control cycle of 100 μsec or less, and calculate the offset voltage between the voltage at the interconnection point and the output voltage of the grid interconnection device.

The grid interconnection device may further include a temperature information acquisition unit for acquiring temperature information. The control unit may further adjust the output power from the grid interconnection device based on the temperature information.

The control unit may further adjust the output power from the grid interconnection device based on the output voltage frequency.

The control unit may further adjust the output power from the grid interconnection device based on the time from the start of operation of the grid interconnection device.

The grid interconnection device may be a power conversion device for converting power generated by the distributed power source into the power corresponding to the utility grid.

The grid interconnection device may further include a storage unit for storing Volt-Var characteristic information. The Volt-Var characteristic information may be information showing a relationship between the voltage at the interconnection point and the reactive power Q to be output from the grid interconnection device. The control unit may control the output power from the grid interconnection device by determining the injection amount or the absorption amount of the reactive power corresponding to the voltage at the interconnection point, which is calculated by the calculation unit with reference to the Volt-Var characteristic information.

The Volt-Var characteristic information may be featured in having a ratio of reactive power to apparent power of 0% in a first region, where $Vo-d_{11} \leq V_{PCC} \leq Vo+d_{12}$ ($V_{PCC}$ is voltage at the interconnection point, Vo is rated voltage, and $d_{11}$ and $d_{12}$ are constants), and having an injection amount of reactive power increased as voltage at the interconnection point decreases in a second region, where $Vo-d_2 \leq V_{PCC} < Vo-d_{11}$ ($d_2$ is a constant, and $d_2 > d_{11}$), and having an absorption amount of reactive power increased as voltage at the interconnection point increases in a third region, where $Vo+d_{12} < V_{PCC} < Vo+d_3$ ($d_3$ is a constant, and $d_3 > d_{12}$).

In the Volt-Var characteristic information, an injection amount of reactive power may be a constant in a region where $Vo-d_2 > V_{PCC}$, and an absorption amount of reactive power is a constant in a region where $Vo+d_3 < V_{PCC}$ according to the Volt-Var characteristic information.

A second aspect of the present invention provides a server. The server may be communicatively connected to one or more grid interconnection devices for supplying power generated by a distributed power source to an interconnection point. The server may include a calculation unit, a control information calculation unit and a transmitting unit. The calculation unit may calculate the voltage at the interconnection point based on the output voltage and output current of one or more grid interconnection devices, and the impedance component between the one or more grid interconnection devices and the interconnection point. The control information calculation unit may calculate the control information in order to control the output power of one or more grid interconnection devices, based on the voltage at the interconnection point calculated by the calculation unit. The transmitting unit may transmit the control information to one or more grid interconnection devices.

The server may be communicatively connected to a plurality of grid interconnection devices. The control information calculated by the control information calculation unit may be respectively different for each grid interconnection device.

The control information may be information about the reactive power to be output from the one or more grid interconnection devices.

The control information may include information showing a relationship between the output voltage of the one or more grid interconnection devices and the reactive power to be output from the one or more grid interconnection devices.

The summary clause does not necessarily describe all necessary features of the embodiments of the present invention. The present invention may also be a sub-combination of the features described above.

DESCRIPTION OF EXEMPLARY EMBODIMENTS

Hereinafter, the invention will be described through embodiments of the present invention, but the following embodiments do not limit the invention according to claims. Further, not all of the combinations of features described in the embodiments are essential for means to solve the problem in the invention.

Figure 1:
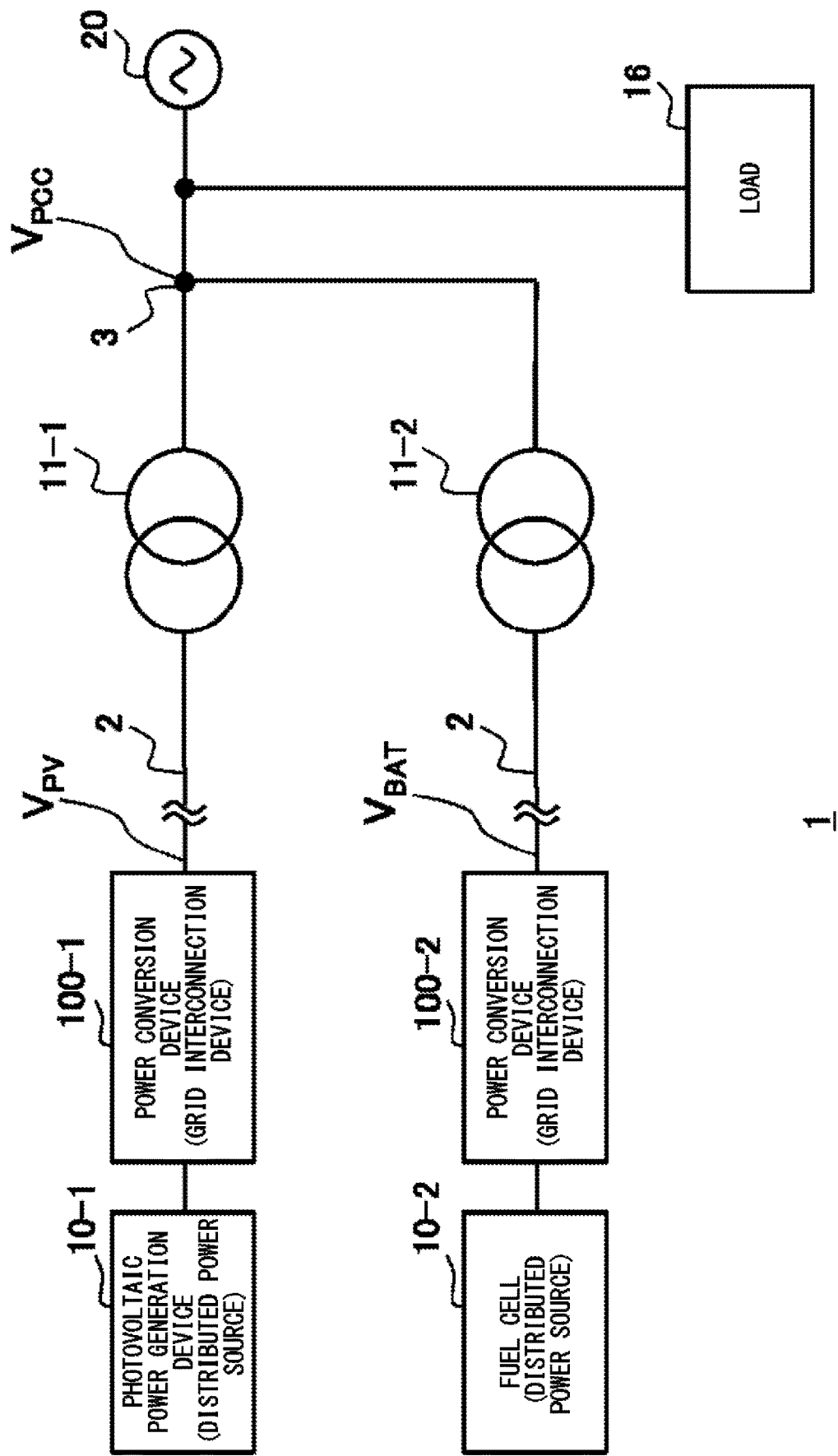
FIG. 1 illustrates one example of a power generation system 1 in a first embodiment of the present invention.

FIG. 1 illustrates one example of a power generation system 1 of a first embodiment of the present invention. FIG. 1 schematically shows the configuration of the power generation system 1. The power generation system 1 is a system provided in a utility grid 2. In one example, the power generation system 1 includes distributed power sources 10-1 and 10-2, power conversion devices 100-1 and 100-2 (hereinafter, it may be collectively referred to as a power conversion device 100), transformers 11-1 and 11-2, a load 16 and a grid power source 20. The number of each configuration is not limited to the case shown in FIG. 1.

The grid power source 20 connected to the utility grid 2 may be equipment for supplying power, which is provided by a power producer that manages the utility grid 2. The grid power source 20 may be, as one example, a power plant, or a substation, or a transformer. In the present example, the grid power source 20 is a substation. The utility grid 2 may be a power grid under the control of the grid power source 20. The load 16 is equipment for receiving power supply and consuming the power. In the present example, the load 16 is electrically connected to an interconnection point 3. However, the connection manner of the load 16 is not limited to this case.

The distributed power sources 10-1 and 10-2 may be a power source such as a photovoltaic power generation device using a solar panel, a wind power generation device, and a fuel cell power generation device. In the present example, the distributed power source 10-1 is a photovoltaic power generation device, and the distributed power source 10-2 is a battery such as a fuel cell or a secondary battery. However, the type and number of the distributed power sources 10-1 and 10-2 are not limited to the case shown in FIG. 1.

The power conversion devices 100-1 and 100-2 are one example of a grid interconnection device for supplying power generated by the distributed power sources 10-1 and 10-2 to an interconnection point 3. The input side of the power conversion device 100-1 is connected to the distributed power source 10-1. The power conversion device 100-1 is configured to convert the power generated by the distributed power source 10-1 into the power corresponding to the utility grid 2. The input side of the power conversion device 100-2 is connected to the distributed power source 10-2. The power conversion device 100-2 is configured to convert the power generated by the distributed power source 10-2 to the power corresponding to the utility grid 2. The power conversion devices 100-1 and 100-2 are also be referred to as a PCS (power conditioning system).

The output side of the power conversion device 100-1 may be electrically connected to an interconnection point 3 via an impedance component. In the present example, the output side of the power conversion device 100-1 is connected to a transformer 11-1. The transformer 11-1 may be provided between the power conversion device (grid interconnection device) 100-1 and the interconnection point 3. The transformer is a device that includes a core, a primary winding and a secondary winding, wherein the core, the primary winding and the secondary winding do not change position with respect to each other. In the transformer 11-1, the primary winding receives AC power and transforms it into the voltage and current by electromagnetic induction action, and if the secondary winding is supplied with AC power of the same frequency, the voltage may not necessarily need to be boosted. For example, the transformer 11-1, which has a winding ratio of 1 between the primary winding and the secondary winding without voltage boost, is provided to insulate the primary side from the secondary side. Of course, the transformer 11-1 may also boost the output voltage of the power conversion device 100-1. The impedance component between the power conversion device 100-1 and the interconnection point 3 may include the impedance component of the transformer 11-1 and the impedance component of the wiring.

The output side of the power conversion device 100-2 may be electrically connected to the interconnection point 3 via the impedance component. In the present example, a transformer 11-2 is connected to the output side of the power conversion device 100-2. The transformer 11-2 may be a boosting transformer for boosting the output voltage of the power conversion device 100-2, or an insulating transformer that does not boost the output voltage of the power conversion device 100-2. The impedance component between the power conversion device 100-2 and the interconnection point 3 may include the impedance component of the transformer 11-2 and the impedance of the wiring.

The output voltage (output side voltage) of the power conversion device 100-1 is referred to as $V_{PV}$, the output voltage (output side voltage) of the power conversion device 100-2 is referred to as $V_{BAT}$, and the voltage at the interconnection point (PCC: Point of Common Coupling, grid interconnection point) is referred to as $V_{PCC}$. In the present example, the $V_{PCC}$ may be the output side voltage of the transformers 11-1 and 11-2.

Figure 2:
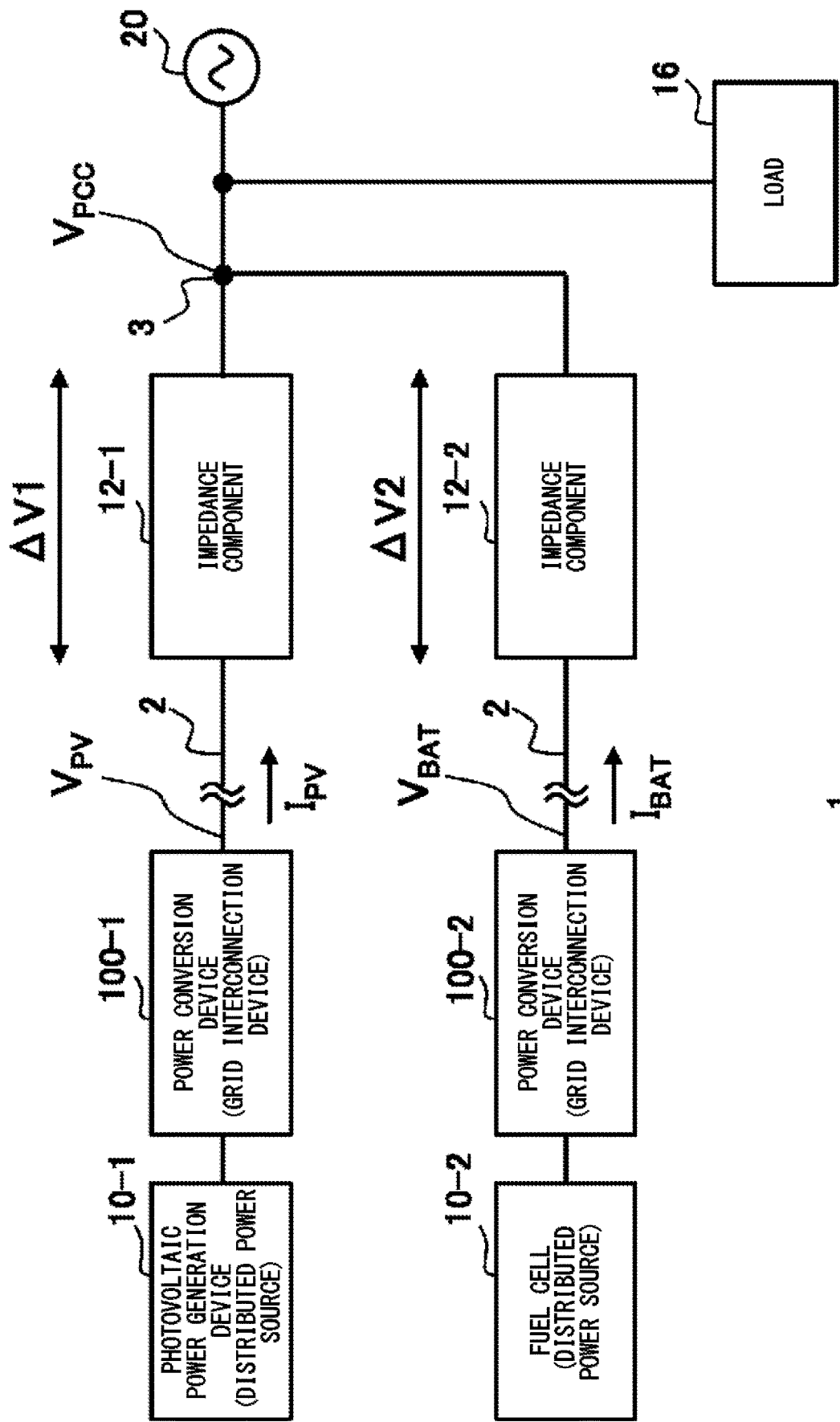
FIG. 2 illustrates one example of voltage and current in the power generation system 1 in the first embodiment of the present invention.

FIG. 2 illustrates one example of the voltage and current in the power generation system 1 in the first embodiment of the present invention. In the present example, since the power conversion devices 100-1 and 100-2 are far away from the interconnection point 3, it is difficult to directly detect the interconnection point voltage $V_{PCC}$. Also, in order to speed up the response of the control, it is not advisable to directly detect the interconnection point voltage $V_{PCC}$. The power conversion device 100-1 is configured to indirectly control the interconnection point voltage $V_{PCC}$ by adjusting the output voltage $V_{PV}$ of the power conversion device 100-1. Similarly, the power conversion device 100-2 is configured to indirectly control the $V_{PCC}$ by adjusting the output voltage $V_{BAT}$ of the power conversion device 100-2.

As shown in FIG. 2, there is an offset voltage $\Delta V_1$ between the output voltage $V_{PV}$ and $V_{PCC}$ of the power conversion device 100-1. Similarly, there is an offset voltage $\Delta V_2$ between the output voltage $V_{BAT}$ and $V_{PCC}$ of the power conversion device 100-2.

The impedance component 12-1 between the power conversion device 100-1 and the interconnection point 3 is referred to as $Z_1$, the output current from the power conversion device 100-1 is referred to as $I_{PV}$, and the offset voltage $\Delta V_1$ becomes $\Delta V_1 = Z_1 \cdot I_{PV}$. Then, the voltage $V_{PCC}$ is shown as the expression of $V_{PCC} = V_{PV} - \Delta V_1$. Similarly, the impedance component 12-2 between the power conversion device 100-2 and the interconnection point 3 is referred to as $Z_2$, the output current of the power conversion device 100-2 is referred to as $I_{BAT}$, and the offset voltage $\Delta V_2$ becomes $\Delta V_2 = Z_2 \cdot I_{BAT}$. Then, the voltage $V_{PCC}$ is shown as the expression of $V_{PCC} = V_{BAT} - \Delta V_2$.

Figure 3:
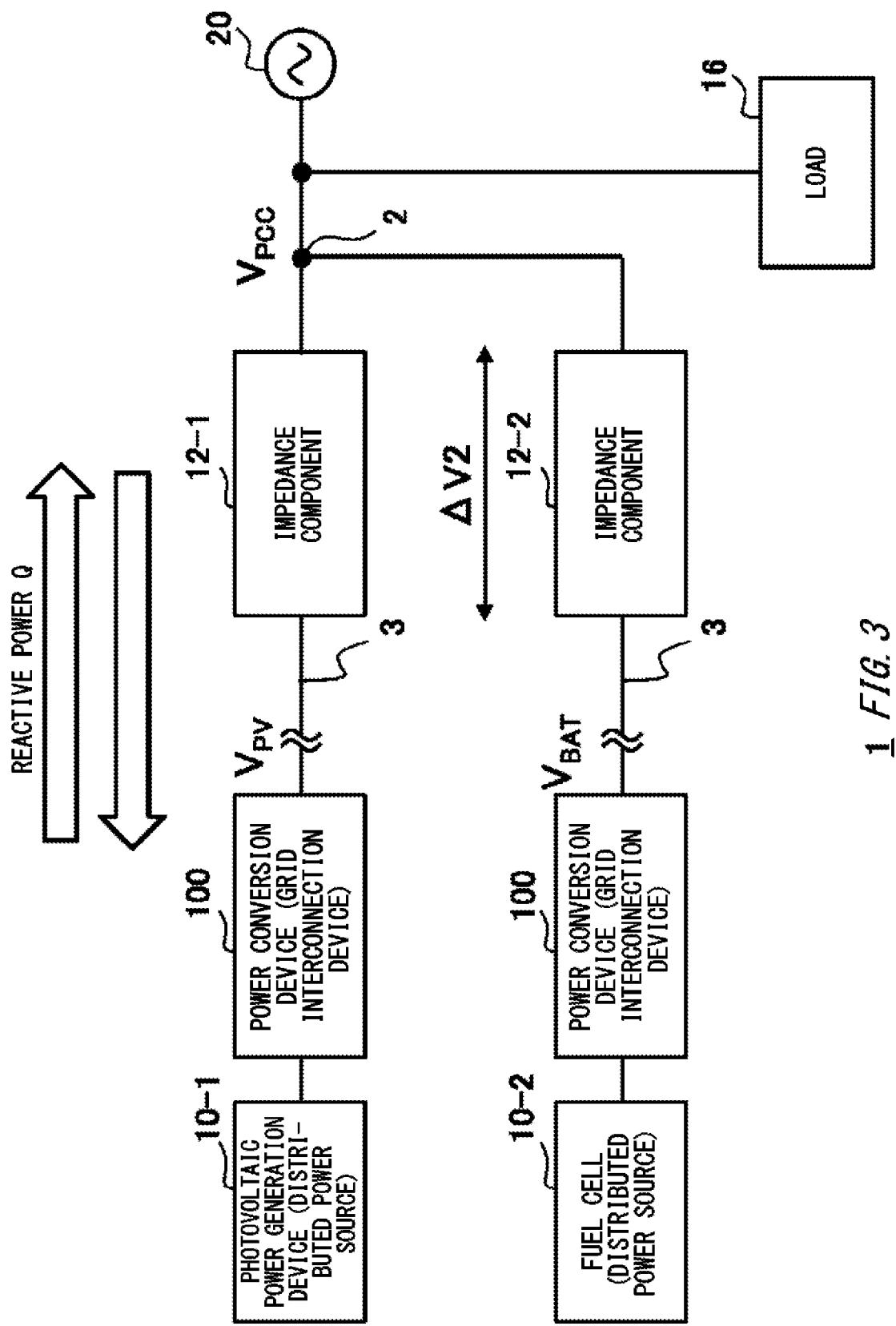
FIG. 3 illustrates the control of reactive power Q in a power conversion device 100 in the first embodiment of the present invention.

FIG. 3 schematically illustrates the control contents of reactive power Q in the power conversion device 100 in the first embodiment of the present invention. In the power conversion devices 100-1 and 100-2, generally the voltage $V_{PCC}$ at the interconnection point 3 is affected more by the change in reactive power than by the change in active power. Accordingly, it is desirable to adjust the voltage $V_{PCC}$ by controlling the reactive power. The power conversion devices 100-1 and 100-2 are configured to execute the process that is called as Volt-Var control. The Volt-Var control is a control for adjusting the voltage $V_{PCC}$ by the injection of the reactive power into the utility grid 2, and/or the absorption of the reactive power from the utility grid 2.

Figure 4:
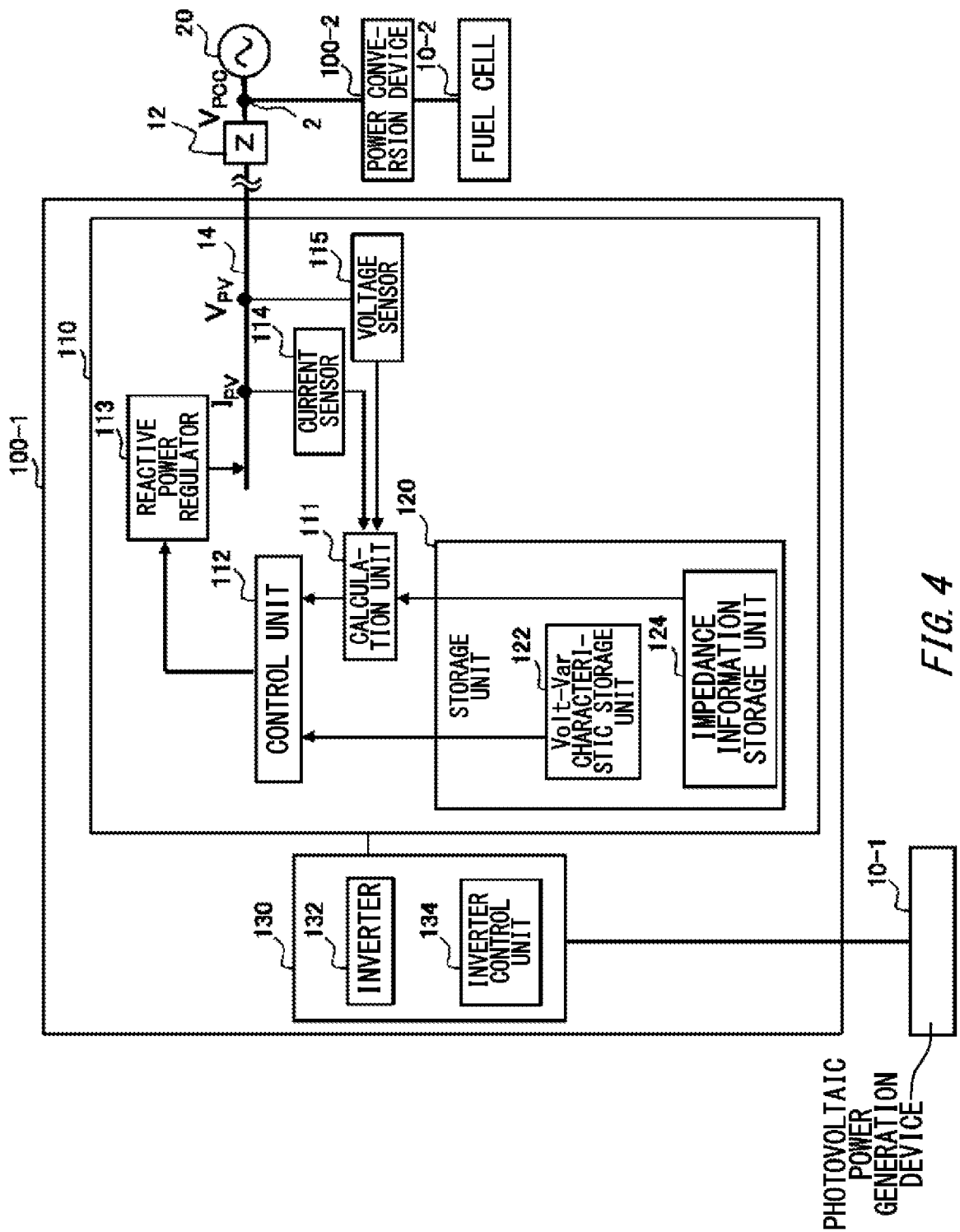
FIG. 4 illustrates one example of a configuration of the power conversion device 100 in the first embodiment of the present invention.

FIG. 4 illustrates one example of a configuration of the power conversion device 100-1 in the first embodiment of the present invention. The power conversion device 100-2 may have the same configuration as the configuration shown in FIG. 4. The power conversion device 100-1 may include a control device 110 and a power conversion unit 130.

The control device 110 may include a calculation unit 111, a control unit 112, a reactive power regulator 113, and a storage unit 120. The storage unit 120 may include a Volt-Var characteristic storage unit 122 and an impedance information storage unit 124. The Volt-Var characteristic storage unit 122 is configured to store Volt-Var characteristic information. The Volt-Var characteristic information is the characteristic information used for Volt-Var control. Details about the Volt-Var characteristic information will be described later. The impedance information storage unit 124 is configured to store the value $Z_1$ of the impedance component 12-1 between the power conversion device 100 and the interconnection point 3.

The power conversion unit 130 is configured to convert the power from the distributed power source 10-1 into AC power corresponding to the utility grid 2. The power conversion unit 130 includes an inverter 132 and an inverter control unit 134. In the present example, the power conversion unit 130 may be connected to the positive electrode terminal P and the negative electrode terminal N of the distributed power source 10-1. The power conversion unit 130 is configured to convert DC power into three-phase AC power, for example. However, the power conversion unit 130 may also convert the power from the distributed power source 10-1 into multiphase AC power other than three-phase AC power, or single-phase AC power.

The inverter 132 is configured to convert the DC power or AC power from the distributed power source 10-1 into the AC power suitable for the utility grid and output it. The inverter control unit 134 is configured to control the voltage, frequency and phase of the AC power output by the inverter 132 to match the power of the utility grid side.

In the control device 110, the calculation unit 111 calculates the voltage $V_{PCC}$ at the interconnection point 3 based on the output voltage $V_{PV}$ of the power conversion device 100-1, the output current $I_{PV}$ of the power conversion device 100-1 and the impedance value $Z_1$. The calculation unit 111 acquires the output current $I_{PV}$ by measurement with the current sensor 114. The calculation unit 111 acquires the output voltage $V_{PV}$ by measurements with the voltage sensor 115. The power conversion device 100-1 may include or not include the current sensor 114 and the voltage sensor 115. For example, if the power conversion device 100-1 does not include the current sensor 114 and the voltage sensor 115, the current sensor 114 and the voltage sensor 115 may be the sensors provided outside the power conversion device 100-1.

The impedance value $Z_1$ is the impedance value of the impedance component 12-1 between the power conversion device 100-1 and the interconnection point 3. The impedance component 12-1 may include the wiring impedance between the power conversion device 100-1 and the interconnection point 3. The impedance component 12-1 may include the impedance component of the transformer 11-1. However, the impedance component 12-1 is not limited to these cases.

The value $Z_1$ of the impedance component 12-1 may be calculated in advance by the length, the shape and so on of the wiring between the power conversion device 100-1 and the interconnection point 3, and stored in the impedance information storage unit 124. The value $Z_1$ of the impedance component 12-1 may also be calculated based on a simulation process. The calculation unit 111 may calculate the voltage $V_{PCC}$ at the interconnection point 3 by $V_{PCC}=V_{PV}31 Z_1 \cdot I_{PV}$.

In the power conversion device 100-1, the calculation unit 111 is configured to detect the output voltage $V_{PV}$ of the power conversion device 100-1 and the output current $I_{PV}$ of the power conversion device 100-1 for each control cycle, and calculate the offset voltage $(\Delta V_1 = Z_1 \cdot I_{PV})$ between the voltage $V_{PCC}$ at the interconnection point 3 and the output voltage $V_{PV}$ of the power conversion device 100-1.

Similarly, in the power conversion device 100-2, the calculation unit 111 is configured to detect the output voltage $V_{BAT}$ of the power conversion device 100-2 and the output current $I_{BAT}$ of the power conversion device 100-2 for each control cycle, and calculate the offset voltage $(\Delta V_2 = Z_2 \cdot I_{BAT})$ between the voltage $V_{PCC}$ at the interconnection point 3 and the output voltage $V_{BAT}$ of the power conversion device 100-2. The control cycle may be 100 μsec or less, or more preferably 10 μsec or less. In the power conversion device 100-1, the control unit 112 controls the output power from the grid interconnection device 101-1 based on the voltage $V_{PCC}$ at the interconnection point 3 calculated by the calculation unit 111.

Figure 5:
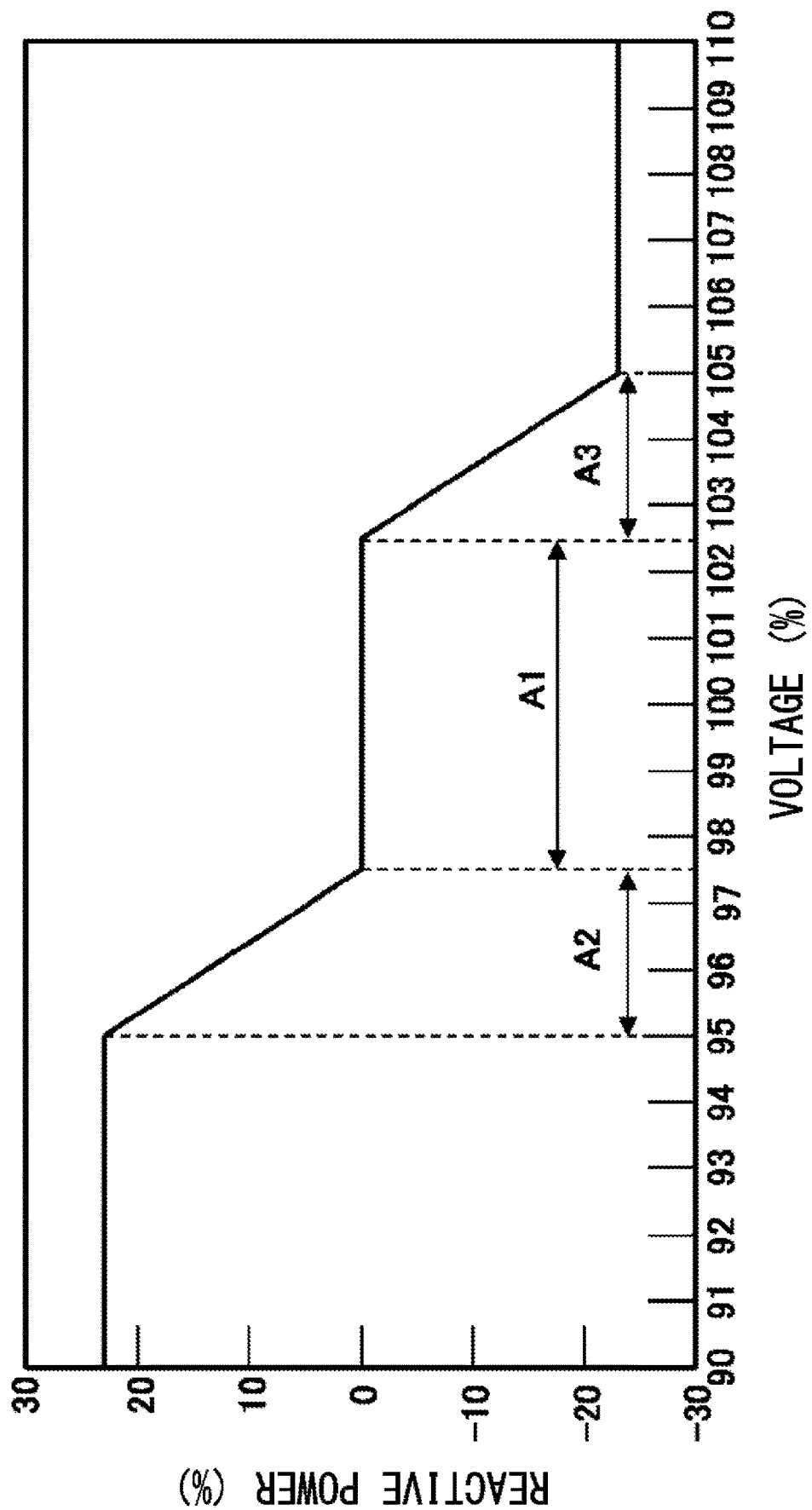
FIG. 5 illustrates one example of Volt-Var characteristic.

FIG. 5 illustrates one example of Volt-Var characteristic information. The Volt-Var characteristic information is also referred to as Volt-Var curve. The Volt-Var characteristic information is information showing the relationship, in the power conversion device 100, between the voltage $V_{PCC}$ at the interconnection point 3 and the reactive power Q to be output from the power conversion device 100. The Volt-Var characteristic information may also be a lookup table.

In FIG. 5, the horizontal axis indicates the voltage $V_{PCC}$ at the interconnection point 3. In the present example, the horizontal axis indicates the magnitude of the voltage $V_{PCC}$ as a percentage of the rated voltage of the voltage $V_{PCC}$, which is 100%. The vertical axis indicates reactive power Q to be injected or absorbed for adjusting the voltage $V_{PCC}$. In the present example, the vertical axis indicates the amount of reactive power Q as a percentage, which shows the ratio of reactive power to apparent power.

In the vertical axis, when the reactive power Q is positive, it indicates that the control unit 112 injects reactive power Q into the utility grid 2, and when reactive power Q is negative, it indicates that the control unit 112 absorbs reactive power Q from the utility grid 2. Note that the calculation unit 111 and the control unit 112 may be realized by software executed by CPU, or realized by hardware such as a logic circuit.

Inside the utility grid 2, as the reactive power increases, the voltage $V_{PCC}$ increases. On the other hand, inside the utility grid 2, as the reactive power decreases, the voltage $V_{PCC}$ decreases. In the present example, when the voltage $V_{PCC}$ is in a first region A1 (a range where $Vo-d_{11} \leq V_{PCC} \leq Vo+d_{12}$, wherein the rated voltage is set as Vo, $d_{11}$ and $d_{12}$ are set as constants in one example), the reactive power may be 0%.

When the voltage $V_{PCC}$ is in a second region A2 (a range where $Vo-d_2 \leq V_{PCC} \leq Vo-d_{11}$, wherein $d_2>d_{11}$, and the rated voltage is set as Vo, $d_{11}$ and $d_2$ are set as constants in one example), the voltage $V_{PCC}$ becomes lower, thereby the injection amount of the reactive power may increase. By increasing the injection amount of the reactive power, the voltage $V_{PCC}$ can be adjusted to be larger. Note that in a region where $Vo-d_2>V_{PCC}$, the injection amount of the reactive power may be a constant.

When the voltage $V_{PCC}$ is in a third region A3 (a range where $Vo+d_{12}<V_{PCC}<Vo+d_3$, wherein $d_3>d_{12}$, wherein the rated voltage is set as Vo, $d_{12}$ and $d_3$ are set as constants in one example), the voltage $V_{PCC}$ becomes higher, thereby the absorption amount of the reactive power may increase. Note that in a region where $Vo+d_3<V_{PCC}$, the absorption amount of the reactive power may be a constant.

The control unit 112 is configured to determine the injection amount or the absorption amount of the reactive power (%) corresponding to the detected voltage $V_{PCC}$ while referring to the Volt-Var characteristic information. The control unit 112 is configured to transmit the indication signal to the reactive power regulator 113 to inject the determined reactive power into the utility grid 2 or absorb the determined reactive power from the utility grid 2. The reactive power regulator 113 may be an electrical condenser or a phase regulator.

Figure 6:
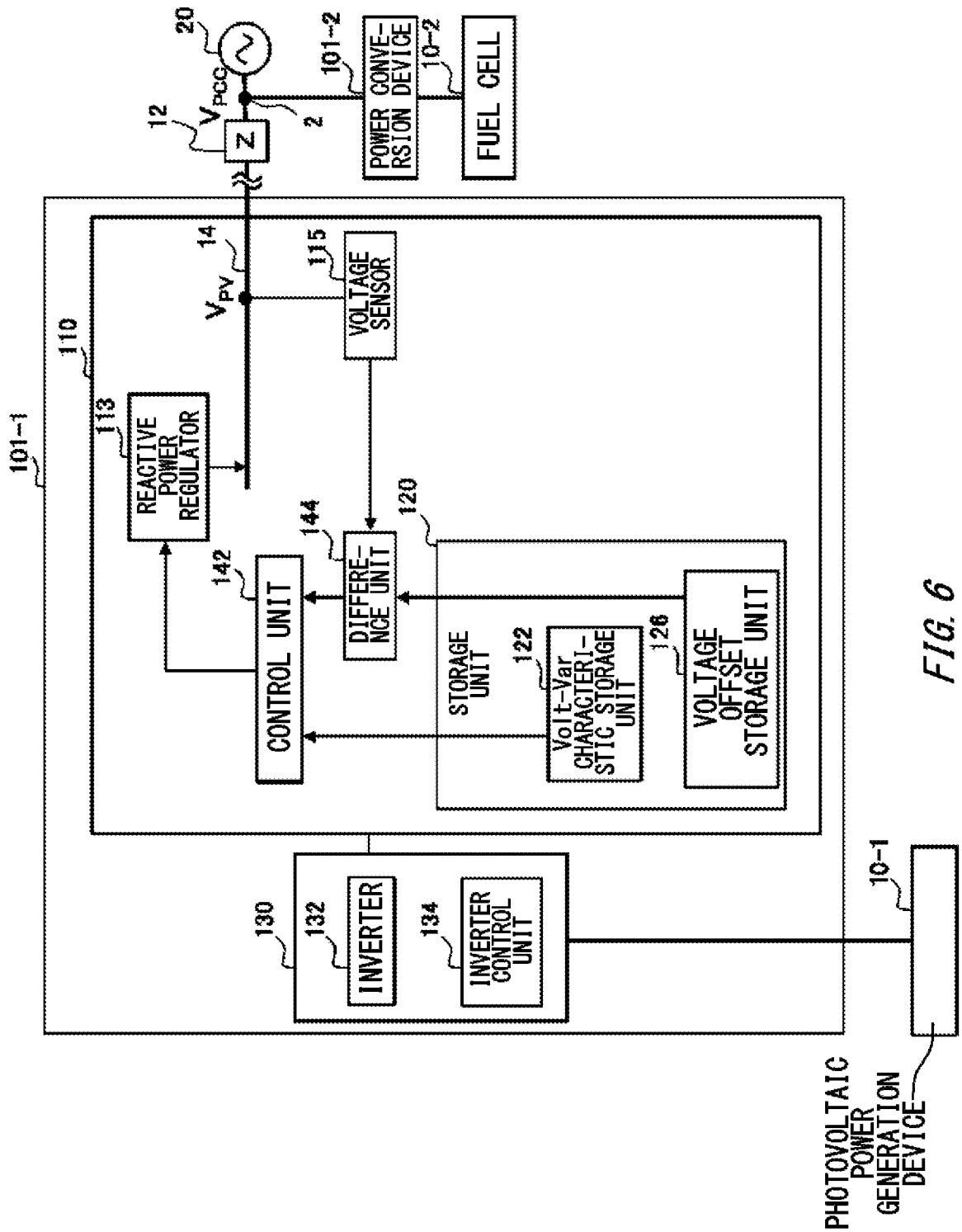
FIG. 6 illustrates one example of a configuration of a power conversion device 101 in a comparative example.

FIG. 6 illustrates one example of a configuration of the power conversion device 101-1 in a comparative example. The power conversion device 101-1 in the comparative example pre-stores the voltage offset value $\Delta V_1$ in the voltage offset storage unit 126. Note that the power conversion device 101-1 in the comparative example pre-stores the voltage offset value $\Delta V_2$ in the voltage offset storage unit 126. In the comparative example, the voltage offset value $\Delta V_1$ or $\Delta V_2$ is a constant regardless of the output current of the power conversion device 101.

The difference unit 144 calculates the voltage $V_{PCC}$ by subtracting the voltage offset value $\Delta V_1$ from the output voltage $V_{PV}$ of the power conversion device 101. However, in the case of the power conversion device 101 in the comparative example, the voltage offset value $\Delta V_1$ is a constant regardless of the current, so it is more difficult to detect the voltage $V_{PCC}$ accurately compared to the power conversion device 100 in the present embodiment shown in FIG. 4. Accordingly, due to the inability to accurately detect the voltage $V_{PCC}$, it is difficult for the control unit 142 to accurately control the reactive power.

On the other hand, according to the power conversion device 100 of the present embodiment shown in FIG. 4, even when the voltage $V_{PCC}$ cannot be detected directly, the voltage $V_{PCC}$ can be detected accurately by calculating the offset voltage $\Delta V_1$ and $\Delta V_2$ as variables. The reactive power can be accurately controlled based on the accurately detected voltage $V_{PCC}$.

Figure 7:
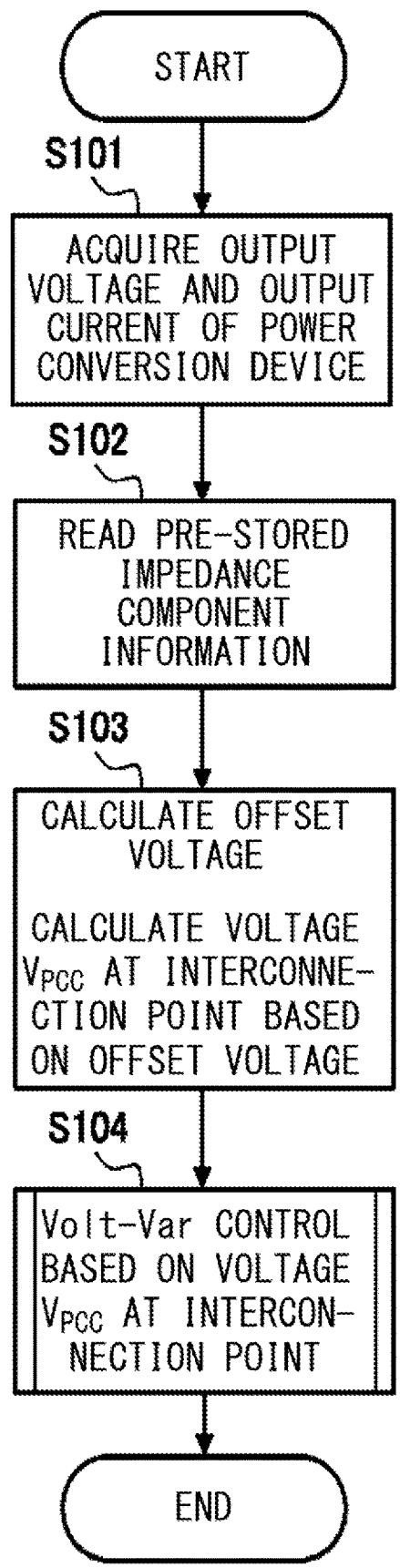
FIG. 7 illustrates a flowchart showing one example of a process by the power conversion device 100.

FIG. 7 illustrates a flowchart showing one example of a process by the power conversion device 100. The calculation unit 111 acquires the output voltage $V_{PV}$ as a measurement result from the voltage sensor 115 while acquiring the output current $I_{PV}$ as a measurement result from the current sensor 114 (step S101). Note that in the process by the power conversion device 100-2, the calculation unit 111 acquires the output current $I_{BAT}$ and the output voltage $V_{BAT}$.

The calculation unit 111 reads the information of the value $Z_1$ of the impedance component 12, which is pre-stored in the impedance information storage unit 124 (step S102). In the process by the power conversion device 100-2, the calculation unit 111 reads the information of the value $Z_2$ of the impedance component 12. The calculation unit 111 calculates the offset voltage $\Delta V_1$ (step S103). In the process by the power conversion device 100-2, the calculation unit 111 calculates the offset voltage $\Delta V_2$.

The calculation unit 111 calculates the voltage $V_{PCC}=V_{PV}-\Delta V_1$ at the interconnection point based on the offset voltage $\Delta V_1$ (step S103). The control unit 112 executes the Volt-Var control based on the voltage $V_{PCC}$ at the interconnection point 3 (step S104). In the process by the power conversion device 100-2, the calculation unit 111 calculates the voltage $V_{PCC}=V_{BAT}-\Delta V_2$ at the interconnection point based on the offset voltage $\Delta V_2$. The control unit 112 executes the Volt-Var control based on the voltage $V_{PCC}$ at the interconnection point 3.

Figure 8:
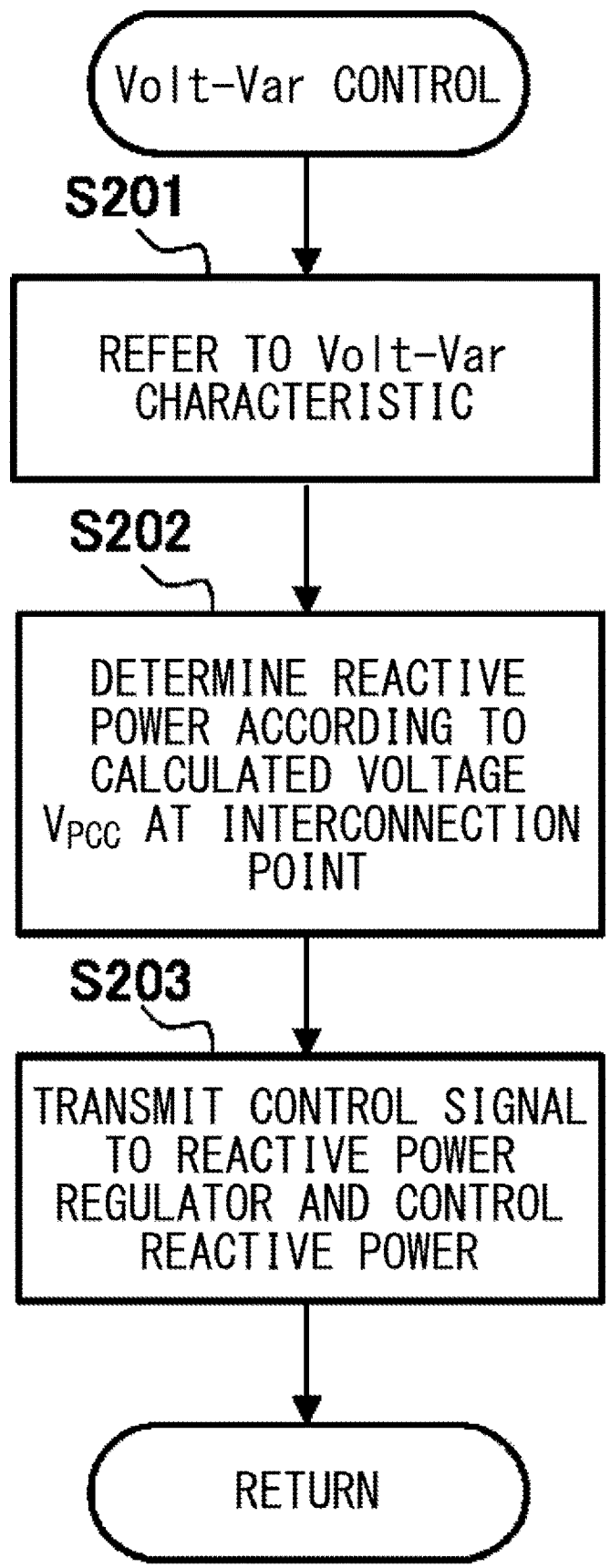
FIG. 8 illustrates a flowchart showing one example of Volt-Var control.

FIG. 8 illustrates a flowchart showing one example of the Volt-Var control. FIG. 8 shows a subroutine of step S104 in FIG. 7. The control unit 112 refers to the Volt-Var characteristic information stored in the Volt-Var characteristic storage unit 122 of the storage unit 120 (step S201). The Volt-Var characteristic information may also be a lookup table showing the relationship, in the power conversion device 100, between the voltage $V_{PCC}$ and the reactive power Q to be output from the power conversion device 100. In the power conversion device 100-1, the control unit 112 determines the reactive power Q to be output from the power conversion device 100 based on the voltage $V_{PCC}$ at the interconnection point 3 calculated by the calculation unit 111 (step S202). The control unit 112 controls the reactive power by transmitting the indication signal to the reactive power regulator 113 (step S203). Note that the control unit 112 adjusts the output voltage $V_{PV}$ of the power conversion device 100 by controlling the reactive power.

As described above, according to the power conversion device 100 of the present embodiment, the voltage $V_{PCC}$ can be accurately detected by subtracting the calculated result of the offset voltage $\Delta V_1$, which changes by the current value or the like, from the output voltage $V_{PV}$ of the power conversion device 100. Based on the accurately detected voltage $V_{PCC}$, the reactive power can be accurately controlled.

Figure 9:
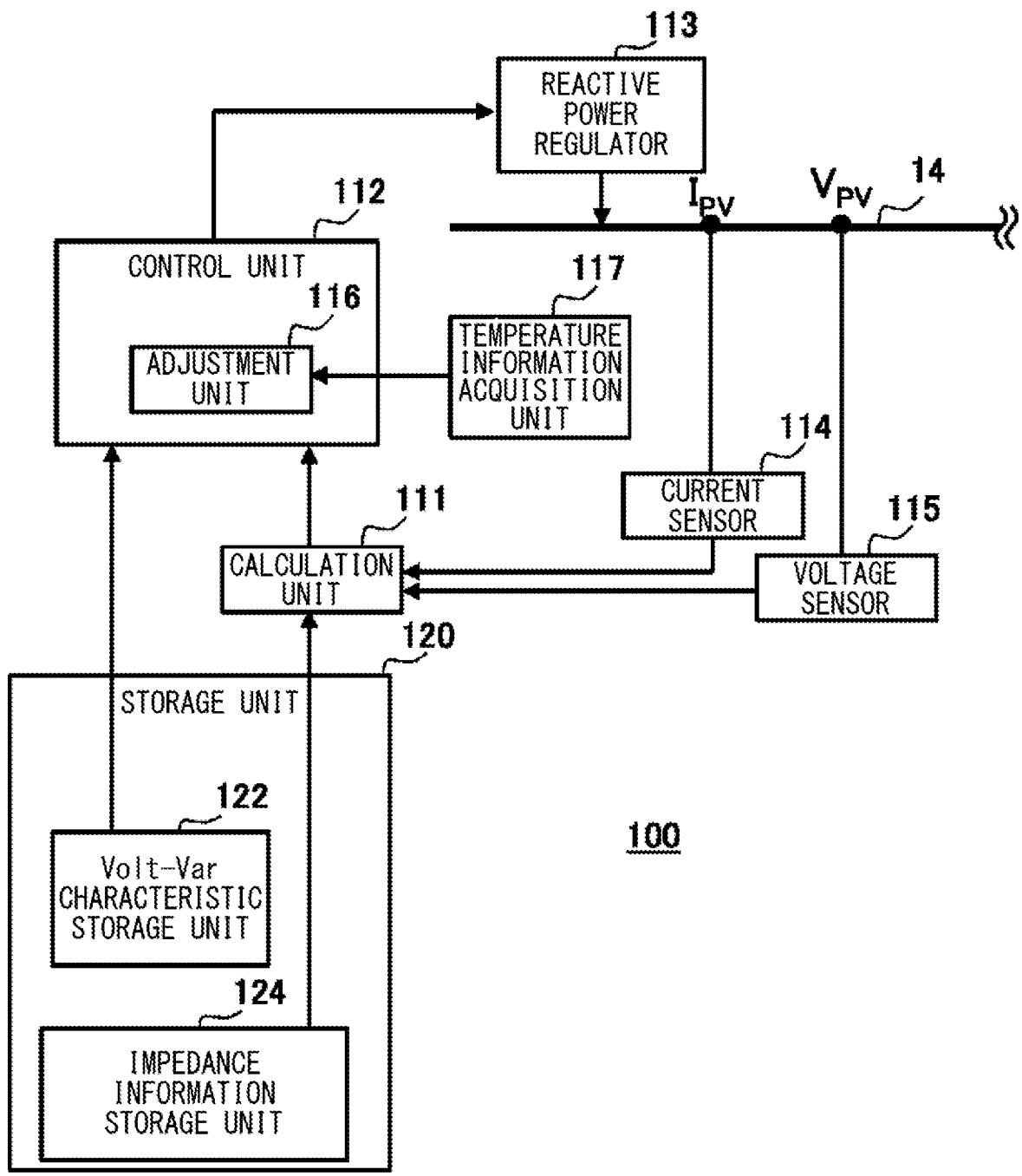
FIG. 9 illustrates another example of the power conversion device 100.

FIG. 9 illustrates another example of the power conversion device 100. In FIG. 9, the configuration of the control unit 112 of the power conversion device 100 is mainly shown. The other configurations in the power conversion device 100 of the present example may be the same as the configurations as shown in FIG. 4. The control unit 112 may include an adjustment unit 116. The power conversion device 100 may include a temperature information acquisition unit 117. The temperature information acquisition unit 117 is configured to acquire temperature information. The temperature information acquisition unit 117 may be a temperature sensor. The temperature information may be temperature itself, or may be information of another physical property value that relates to temperature.

The control unit 112 is configured to control the output power from the grid interconnection device 101-1 based on the voltage $V_{PCC}$ at the interconnection point 3, which is calculated by the calculation unit 111. Further, the control unit 112 is configured to control the output power from the grid interconnection device 101-1 based on the temperature information. In other words, the adjustment unit 116 is configured to readjust the output power from the grid interconnection device 101-1, which is controlled based on the voltage $V_{PCC}$. According to the example shown in FIG. 9, when the value $Z_1$ of the impedance component 12 has changed by the temperature, the control unit 112 accurately detects the voltage $V_{PCC}$ with the change taken into account. Also, based on the accurately detected voltage, the reactive power can be accurately controlled.

Figure 10:
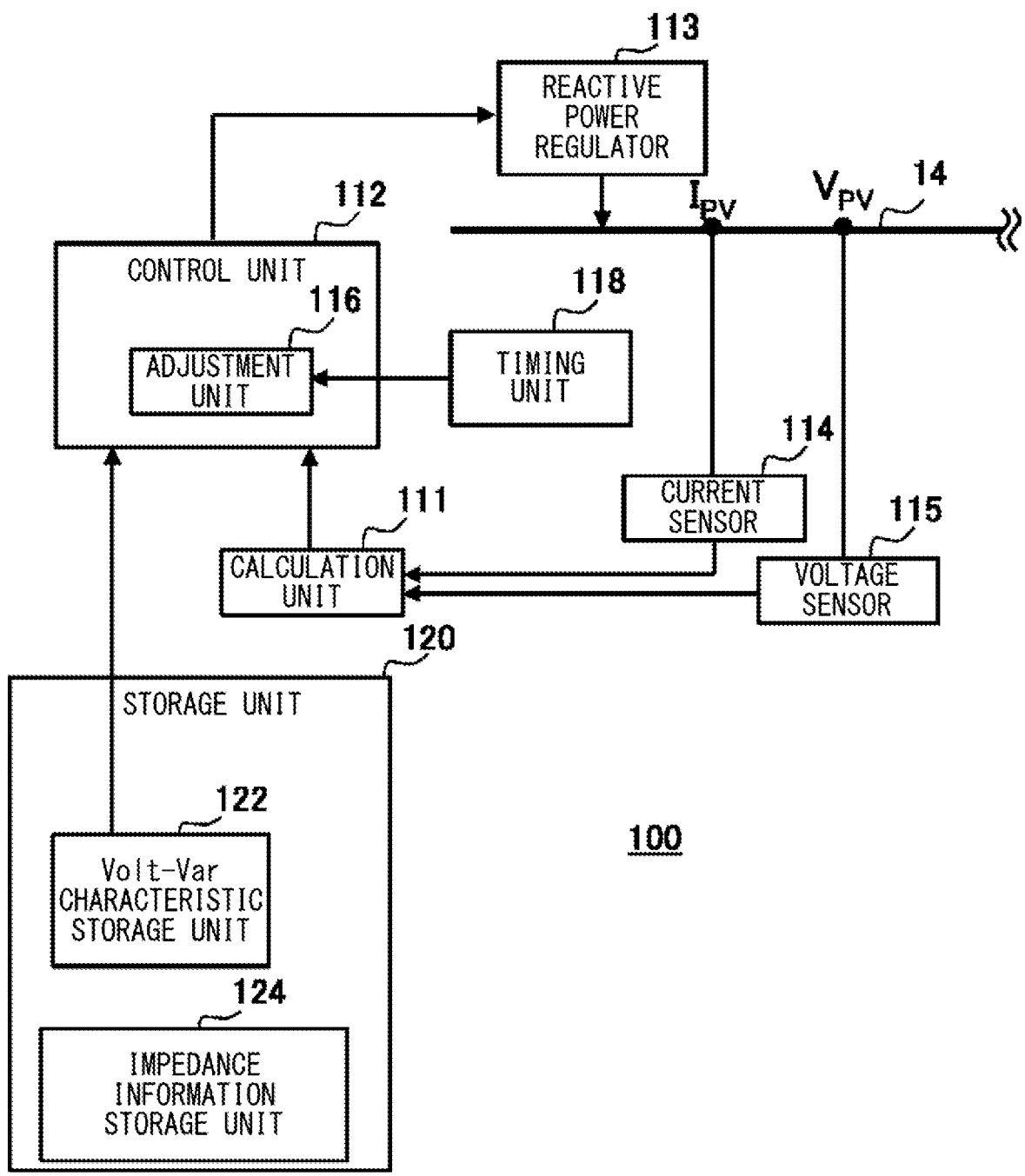
FIG. 10 illustrates another example of the power conversion device 100.

FIG. 10 illustrates another example of the power conversion device 100. In FIG. 10, the configuration of the control unit 112 of the power conversion device 100 is mainly shown. The other configurations in the power conversion device 100 of the present example may be the same as the configurations as shown in FIG. 4. The control unit 112 may include an adjustment unit 116. The power conversion device 100 may include a timing unit 118. The timing unit 118 is configured to measure the time from the start of operation of the power conversion device 100.

The control unit 112 is configured to control the output power from the grid interconnection device 101-1 based on the voltage $V_{PCC}$ at the interconnection point 3, which is calculated by the calculation unit 111. Further, the control unit 112 is configured to control the output power from the grid interconnection device 101-1 based on the time from the start of operation of the power conversion device 100. In other words, the adjustment unit 116 is configured to readjust the output power from the grid interconnection device 101-1 controlled based on the voltage $V_{PCC}$, based on the time from the start of operation of the power conversion device 100.

At the start of operation of the power conversion device 100, the wiring of the utility grid 2 is not warmed up. Then, as time passes from the start of operation of the power conversion device 100, the temperature of the wiring increases and the value $Z_1$ of the impedance component 12 becomes higher. According to the example shown in FIG. 10, when the value $Z_1$ of the impedance component 12 has changed as time passes from the start of operation of the power conversion device 100, the control unit 112 accurately detects the voltage $V_{PCC}$ with the change taken into account. Also, based on the accurately detected voltage, the reactive power can be accurately controlled.

Figure 11:
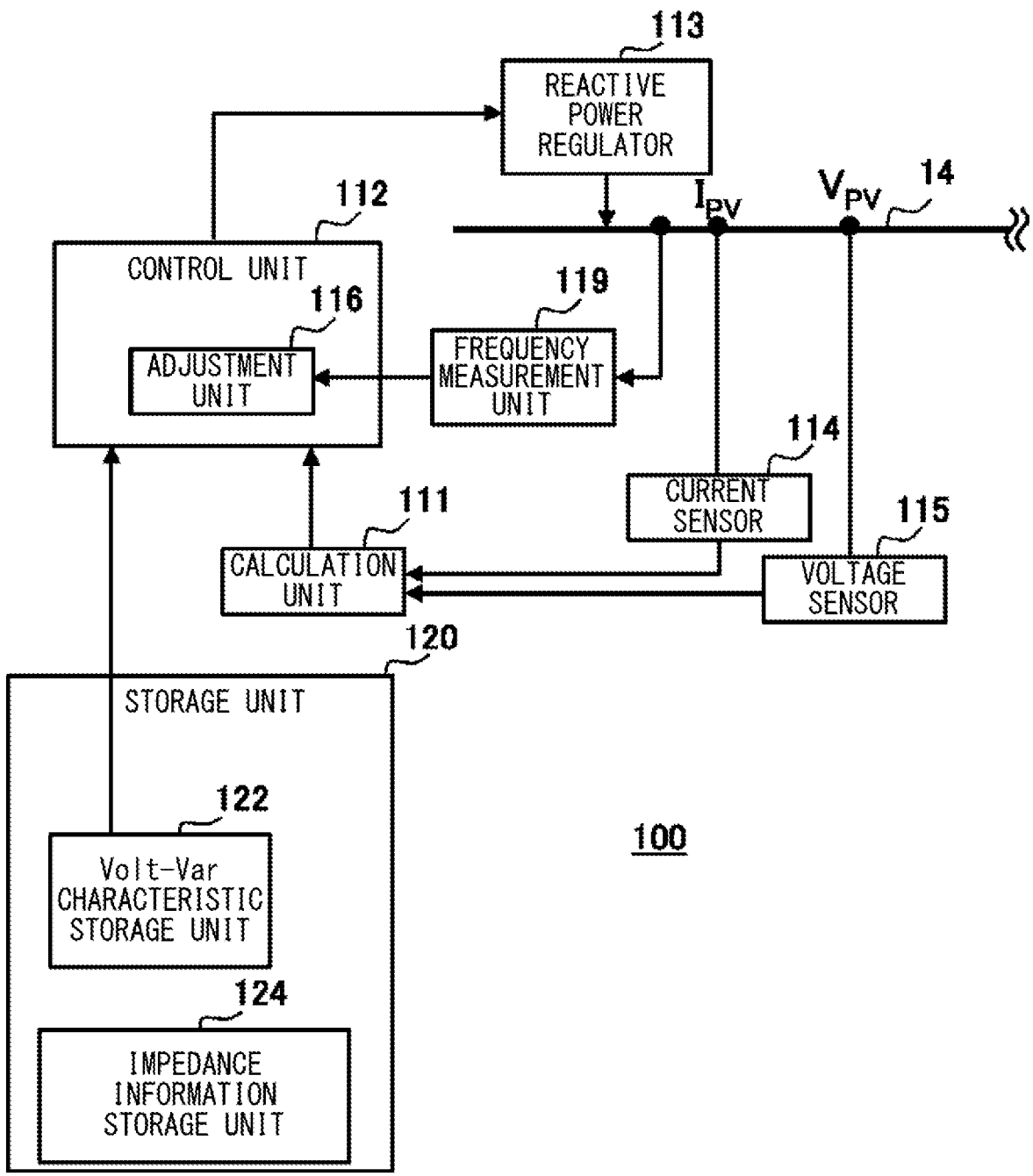
FIG. 11 illustrates another example of the power conversion device 100.

FIG. 11 illustrates another example of the power conversion device 100. In FIG. 11, the configuration of the control unit 112 of the power conversion device 100 is mainly shown. The other configurations in the power conversion device 100 of the present example may be the same as the configurations as shown in FIG. 4. The control unit 112 may include an adjustment unit 116. The power conversion device 100 may include a frequency measurement unit 119. The frequency measurement unit 119 is configured to measure the frequency of the output voltage $V_{PV}$ signal of the power conversion device 100.

The control unit 112 is configured to control the output power from the grid interconnection device 101-1 based on the voltage $V_{PCC}$ at the interconnection point 3, which is calculated by the calculation unit 111. Further, the control unit 112 is configured to control the output power from the grid interconnection device 101-1 based on the output voltage $V_{PV}$ frequency of the power conversion device 100, which is measured by the frequency measurement unit 119. The values $Z_1$, $Z_2$ of the impedance component 12 may change by the frequency. When the values $Z_1$, $Z_2$ of the impedance component 12 has changed accompanying the change of the output voltage frequency, the control unit 112 accurately detects the voltage $V_{PCC}$ with the change taken into account. Also, based on the accurately detected voltage, the reactive power can be accurately controlled.

In one example, the value $Z_1$ of the impedance component 12 inside the impedance information storage unit 124 may be stored by frequency. The value $Z_1$ of the impedance component 12 corresponding to the frequency measured by the frequency measurement unit 119 may be selected from the group of value $Z_1$ of the impedance component 12 stored by frequency.

Note that the control unit 112 may also control the output power from the grid interconnection device 101-1 based on the amount of solar radiation, for example.

Figure 12:
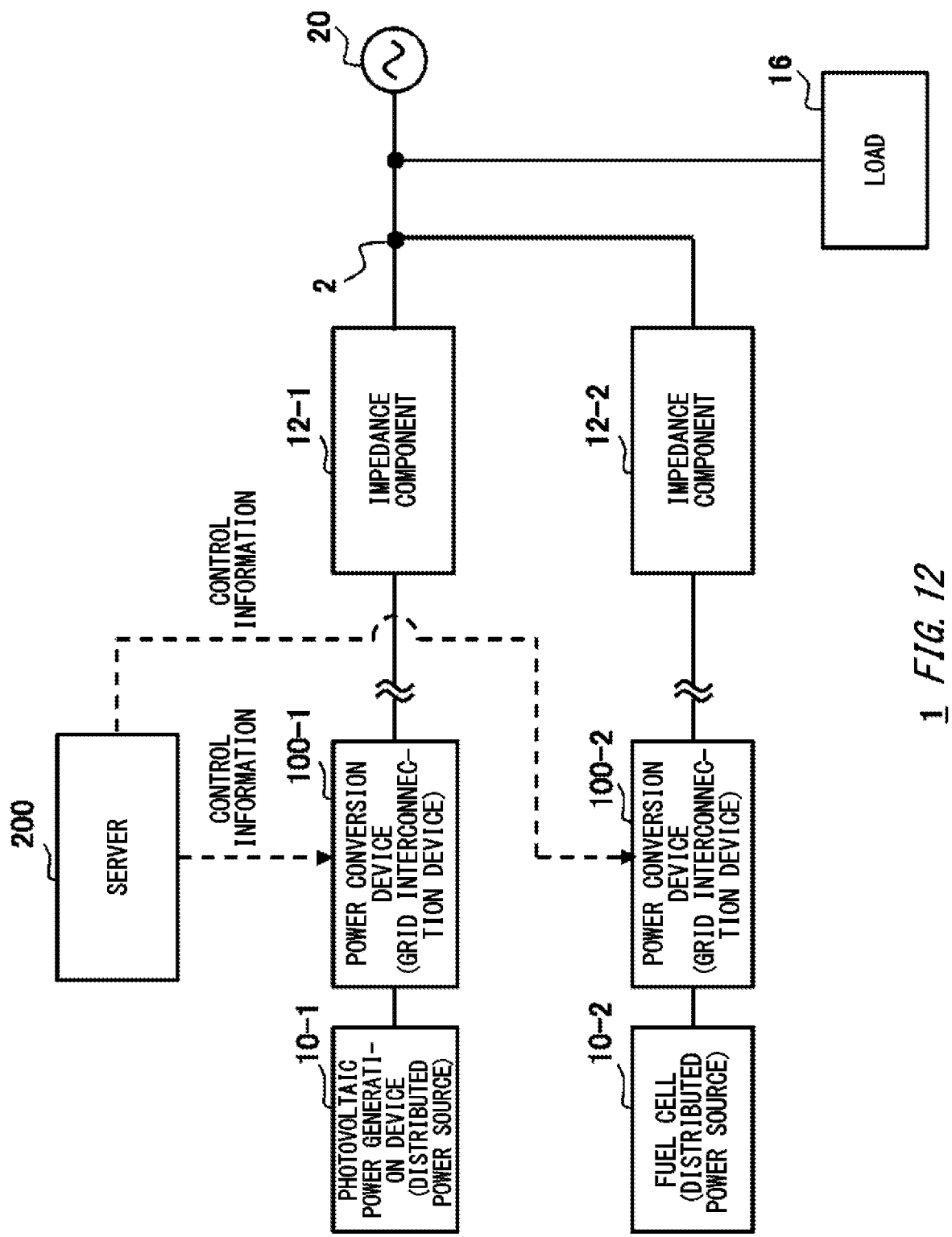
FIG. 12 illustrates one example of the power generation system 1 in a second embodiment of the present invention.

FIG. 12 illustrates one example of the power generation system 1 in the second embodiment of the present invention. In the present example, the power generation system 1 includes a server 200, one or more power conversion devices 100-1 and 100-2. The power conversion devices 100-1 and 100-2 are an example of the grid interconnection device. In the present example, in one server 200, the control information for a plurality of power conversion devices 100-1 and 100-2 is calculated separately. Then, the control information for the plurality of power conversion devices 100-1 and 100-2 are transmitted. The distributed power sources 10-1 and 10-2, the impedance components 12-1 and 12-2, the load 16 and the grid power source 20 are the same as the case of the power generation system 1 in the first embodiment shown in FIG. 2. Accordingly, repeated descriptions are omitted.

The server 200 is connected communicatively to one or more power conversion devices. In the present example, the server 200 is connected communicatively to the plurality of power conversion devices 100-1 and 100-2 via wireless or wired communication lines.

Figure 13:
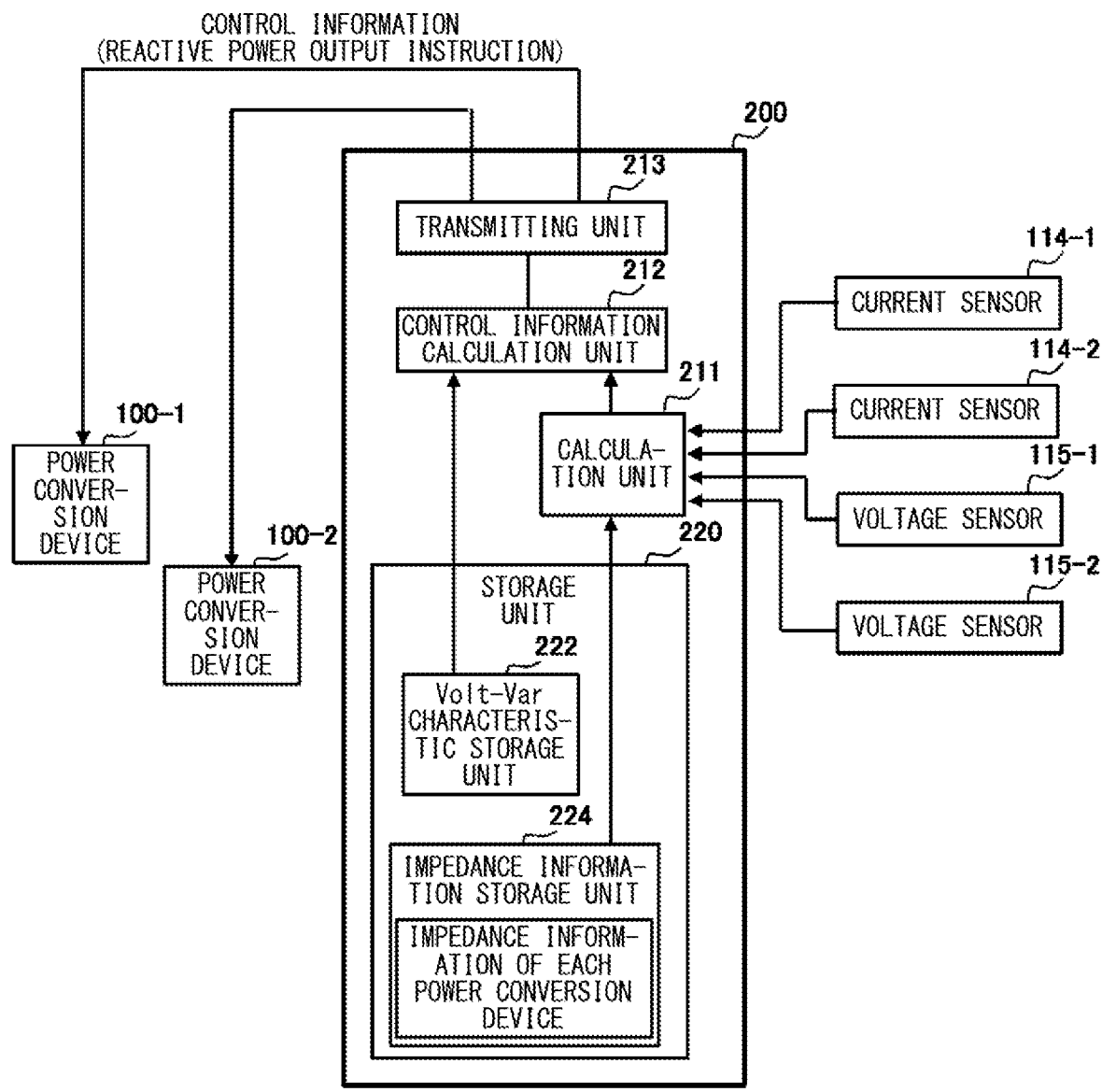
FIG. 13 illustrates one example of a configuration of a server 200 in the second embodiment of the present invention.

FIG. 13 illustrates one example of a configuration of the server 200 in the second embodiment of the present invention. The server 200 includes a calculation unit 211, a control information calculation unit 212, a transmitting unit 213 and a storage unit 220. The calculation unit 211 calculates the voltage at the interconnection point 3 based on the output voltage and output current of one or more grid interconnection devices, and the impedance component between the one or more grid interconnection devices and the interconnection point 3.

In the present example, the calculation unit 211 calculates the voltage $V_{PCC}$ at the interconnection point 3 based on the output voltage and output current of the plurality of power conversion devices 100-1 and 100-2, and the impedance component between the plurality of power conversion devices 100-1 and 100-2 and the interconnection point 3. More specifically, the calculation unit 211 calculates the voltage $V_{PCC}$ at the interconnection point 3 based on the output voltage $V_{PV}$ and the output current $I_{PV}$ of the power conversion device 100-1, and the value $Z_1$ of the impedance component between the power conversion device 100-1 and the interconnection point 3. Similarly, the calculation unit 211 calculates the voltage $V_{PCC}$ at the interconnection point 3 based on the output voltage $V_{BAT}$ and the output current $I_{BAT}$ of the power conversion device 100-2, and the value $Z_2$ of the impedance component between the power conversion device 100-2 and the interconnection point 3.

The control information calculation unit 212 is configured to calculate the control information based on the calculated voltage $V_{PCC}$. The control information is information for controlling the output power of the one or more grid interconnection devices. The control information for controlling the output voltage $V_{PV}$ of the power conversion device 100-1, and the control information for controlling the output voltage $V_{BAT}$ of the power conversion device 100-2 may be separately calculated as the control information. The transmitting unit 213 is configured to transmit the control information to one or more grid interconnection devices.

The control information calculated by the control information calculation unit 212 may be different for each of the respective power conversion devices 100-1 and 100-2. As shown in FIG. 13, the reactive power output instruction may be transmitted to the power conversion devices 100-1 and 100-2 as the control information transmitted from the transmitting unit 213 to the power conversion devices 100-1 and 100-2. The reactive power output instruction may be information about the reactive power that is to be output respectively from the plurality of power conversion devices 100-1 and 100-2.

Figure 14:
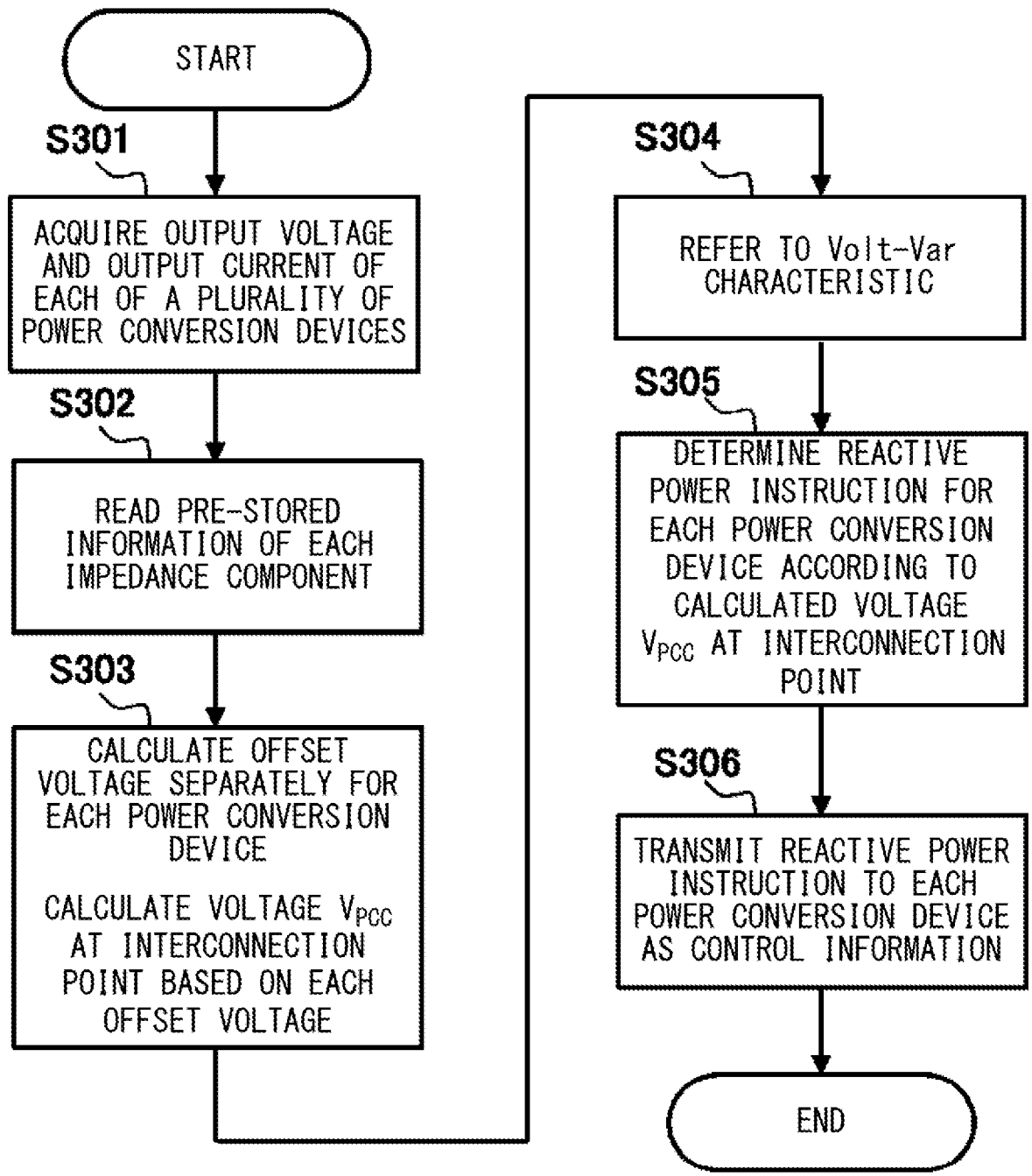
FIG. 14 illustrates a flowchart showing one example of a process by the server 200.

FIG. 14 illustrates a flowchart showing one example of a process by the server 200. In step S301, the calculation unit 211 acquires the output voltage $V_{PV}$ and the output current $I_{PV}$ of the power conversion device 100-1. Similarly, the calculation unit 211 acquires the output voltage $V_{BAT}$ and the output current $I_{BAT}$ of the power conversion device 100-2. The calculation unit 111 reads the information of the value $Z_1$ and $Z_2$ of the impedance component 12, which is pre-stored in the impedance information storage unit 224 (step S302).

In step S303, the calculation unit 211 calculates the offset voltage $\Delta V_1$. The calculation unit 211 calculates the offset voltage $\Delta V_2$. The calculation unit 211 calculates the voltage $V_{PCC}=V_{PV}-\Delta V_1$ at the interconnection point 3 based on the offset voltage $\Delta V_1$. Similarly, the calculation unit 211 calculates the voltage $V_{PCC}=V_{BAT}-\Delta V_2$ at the interconnection point 3 based on the offset voltage $\Delta V_2$.

The control information calculation unit 212 refers to the Volt-Var characteristic information stored in the Volt-Var characteristic storage unit 222 of the storage unit 220 (step S304). The Volt-Var characteristic information is information showing the relationship, in the power conversion device 100, between the voltage $V_{PCC}$ and the reactive power Q to be output from the power conversion device 100. The Volt-Var characteristic information may be the Volt-Var curve shown in FIG. 5, or a lookup table.

The control information calculation unit 212 calculates the control information for controlling the output power $V_{PV}$ of the power conversion device 100-1 based on the voltage $V_{PCC}$ at the interconnection point 3. Specifically, the control information calculation unit 212 determines the reactive power instruction, which is the information about the reactive power Q to be output from the power conversion device 100-1, based on the voltage $V_{PCC}$ at the interconnection point 3 (step S305). The control information calculation unit 212 calculates the control information for controlling the output power $V_{BAT}$ of the power conversion device 100-2 based on the voltage $V_{PCC}$ at the interconnection point 3. Specifically, the control information calculation unit 212 determines the reactive power instruction, which is the information about the reactive power Q to be output from the power conversion device 100-2, based on the voltage $V_{PCC}$ at the interconnection point 3 (step S305). The control information calculated by the control information calculation unit 212 is different for each of the respective power conversion devices 100-1 and 100-2.

The transmitting unit 213 is configured to transmit each reactive power instruction to each of the power conversion device 100-1 and the power conversion device 100-2 as the control information (step S306).

According to the server 200 of the present embodiment, the voltage $V_{PCC}$ can be accurately detected by calculating each offset voltage $\Delta V_1$ and $\Delta V_2$ in the plurality of power conversion devices 100-1 and 100-2 as variables. Based on the accurately detected voltage $V_{PCC}$, the reactive power can be accurately controlled.

Figure 15:
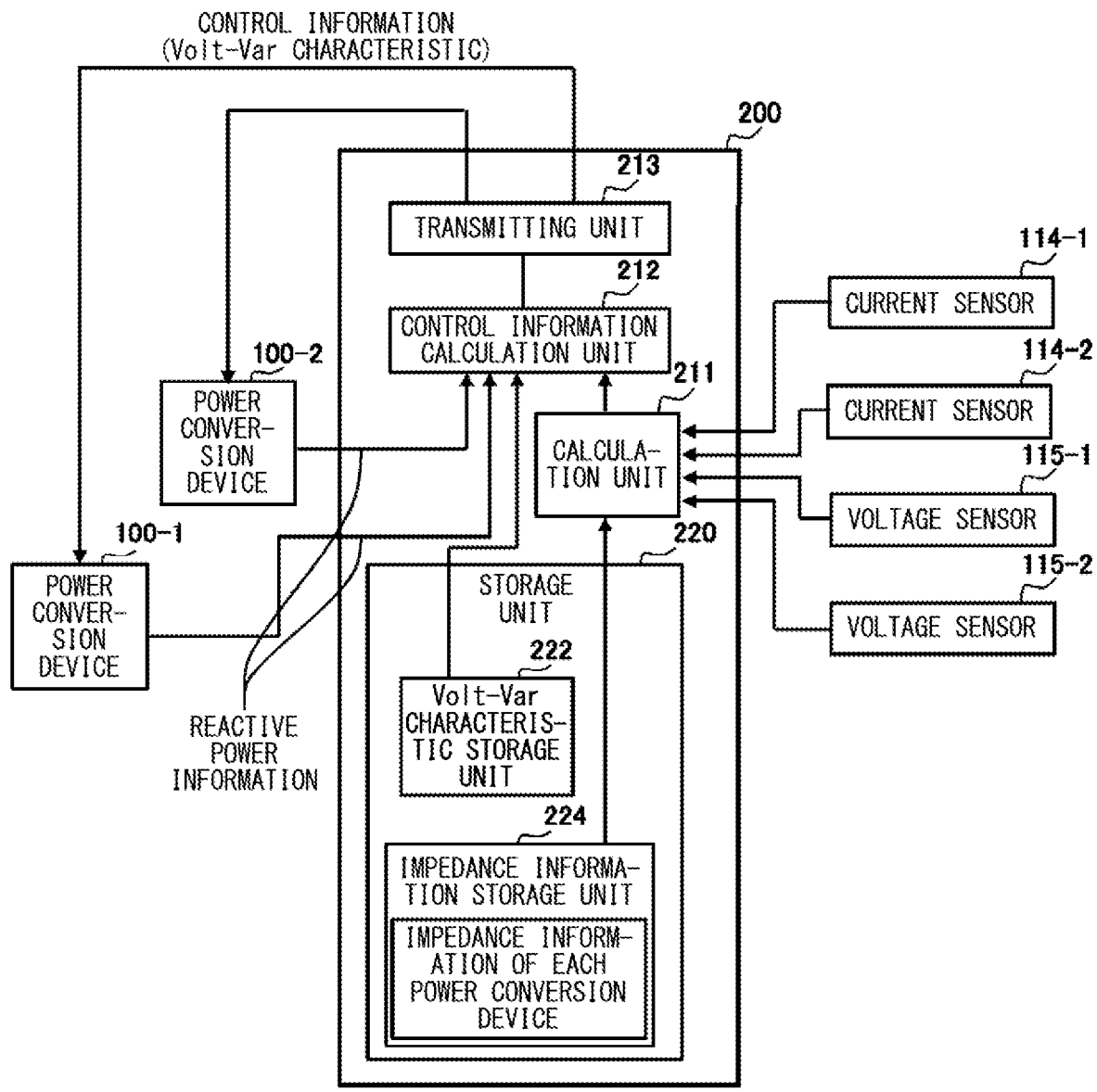
FIG. 15 illustrates another example of the server 200.

FIG. 15 illustrates another example of the server 200. The server 200 shown in FIG. 15 is different from the server 200 shown in FIG. 13 in the control information transmitted to each of the power conversion devices 100-1 and 100-2 by the transmitting unit 213. Also, the control information calculation unit 212 may acquire information about each reactive power value from each of the power conversion devices 100-1 and 100-2. The calculation unit 211 calculates the offset voltage $\Delta V_1$. The calculation unit 211 calculates the offset voltage $\Delta V_2$. The calculation unit 211 calculates the voltage $V_{PCC}=V_{PV}-\Delta V_1$ at the interconnection point 3 based on the offset voltage $\Delta V_1$. Similarly, the calculation unit 211 calculates the voltage $V_{PCC}=V_{BAT}-\Delta V_2$ at the interconnection point 3 based on the offset voltage $\Delta V_2$.

In the present example, the control information calculation unit 212 calculates the value of the reactive power Q to be output from the power conversion device 100-1 based on the voltage $V_{PCC}$ at the interconnection point 3. Similarly, the control information calculation unit 212 calculates the value of the reactive power Q to be output from the power conversion device 100-2 based on the voltage $V_{PCC}$ at the interconnection point 3. On the other hand, the control information calculation unit 212 acquires information about the reactive power injected to or absorbed from the utility grid 2 in the power conversion device 100-1. The control information calculation unit 212 acquires the information about the reactive power injected to or absorbed from the utility grid 2 in the power conversion device 100-2.

The control information calculation unit 212 compares the reactive power Q to be output from the power conversion device 100-1 to the reactive power actually injected to or absorbed from the utility grid 2 in the power conversion device 100-1. The control information calculation unit 212 adjusts the Volt-Var characteristic information (Volt-Var curve) showing the relationship between the output voltage $V_{PV}$ of the power conversion device 100-1 and the reactive power Q to be output from the power conversion device 100 based on the comparison result between the reactive power Q to be output and the actual reactive power. Similarly, the control information calculation unit 212 compares the reactive power Q to be output from the power conversion device 100-2 to the reactive power actually injected to or absorbed from the utility grid 2 in the power conversion device 100-2. The control information calculation unit 212 adjusts the Volt-Var characteristic information showing the relationship between the output voltage $V_{BAT}$ of the power conversion device 100-2 and the reactive power Q to be output from the power conversion device 100 based on the comparison result between the reactive power Q to be output and the actual reactive power.

The transmitting unit 213 transmits the adjusted Volt-Var characteristic information (Volt-Var curve) to each of the power conversion device 100-1 and the power conversion device 100-2 as the control information. Note that between the power conversion device 100-1 and the power conversion device 100-2, since the impedances $Z_1$ and $Z_2$ are different up to the interconnection point 3, the adjusted Volt-Var characteristic information (Volt-Var curve) to be transmitted to each of them is also different for each power conversion device.

Figure 16:
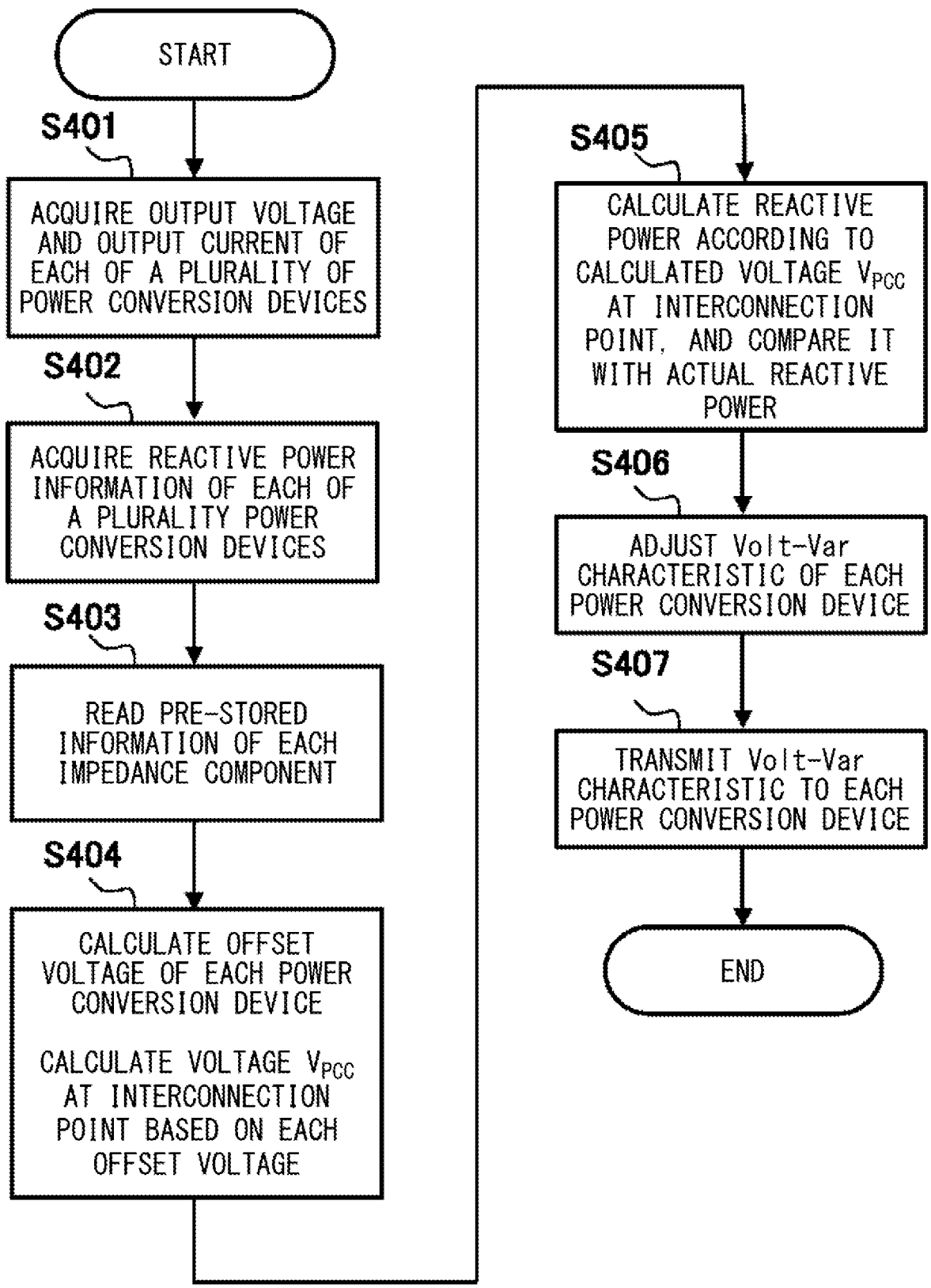
FIG. 16 illustrates a flowchart showing another example of a process by the server 200.

FIG. 16 illustrates a flowchart showing another example of a process by the server 200. Step S401 is the same as step S301 in FIG. 14. Next, the control information calculation unit 212 acquires information of the reactive power value of each of the plurality of power conversion devices 100-1 and power conversion devices 100-2 (step S402). The processes in step S403 and step S404 are the same as the processes in step S302 and step S303 as shown in FIG. 14. Accordingly, detailed descriptions are omitted.

The control information calculation unit 212 refers to the Volt-Var characteristic information. The Volt-Var characteristic information may also be a lookup table showing the relationship, in the power conversion device 100, between the voltage $V_{PCC}$ and the reactive power Q to be output from the power conversion device 100. The control information calculation unit 212 determines the reactive power Q to be output from the power conversion device 100-1 based on the voltage $V_{PCC}$ at the interconnection point 3 calculated by the calculation unit 211. Similarly, the control information calculation unit 212 determines the reactive power Q to be output from the power conversion device 100-2 based on the voltage $V_{PCC}$ at the interconnection point 3 calculated by the calculation unit 211. Then, the control information calculation unit 212 compares the reactive power Q to be output from the power conversion device 100-1 to the reactive power actually output from the power conversion device 100-1 (step S405). Similarly, the control information calculation unit 212 compares the reactive power Q to be output from the power conversion device 100-2 and the reactive power Q actually output from the power conversion device 100-2.

The difference between the reactive power Q to be output from the power conversion device 100-1 and the reactive power actually output from the power conversion device 100-1 is considered to be due to the presence of the offset voltage $\Delta V_1$. The control information calculation unit 212 adjusts the Volt-Var curve showing the relationship between the output voltage $V_{PV}$ of the power conversion device 100-1 and the reactive power Q to be output from the power conversion device 100 so that this difference is within a predetermined range (step S406).

The difference between the reactive power Q to be output from the power conversion device 100-2 and the reactive power output actually from the power conversion device 100-2 is considered to be due to the presence of the offset voltage $\Delta V_2$. The control information calculation unit 212 adjusts the Volt-Var characteristic information that is the information showing the relationship between the output voltage $V_{BAT}$ of the power conversion device 100-2 and the reactive power Q to be output from the power conversion device 100 so that this difference is within a predetermined range (step S406). As a result, different adjusted Volt-Var characteristic information is created separately for each of the power conversion devices 100-1 and 100-2.

The transmitting unit 213 transmits the adjusted Volt-Var characteristic information separately to each of the power conversion devices 100-1 and 100-2 as the control information (step S407).

According to the present example, the server 200 transmits the adjusted Volt-Var characteristic information separately to each of the power conversion devices 100-1 and 100-2. Accordingly, each of the power conversion devices 100-1 and 100-2 can determine the reactive power Q corresponding to the output voltage $V_{PV}$ ($V_{BAT}$) with reference to the received Volt-Var characteristic information.

In the server 200 of the present embodiment, the calculation unit 211 acquires the output voltage $V_{PV}$ of the power conversion device 100-1, the output voltage $V_{BAT}$ of the power conversion device 100-2, the output current $I_{PV}$ of the power conversion device 100-1 and the output current $I_{BAT}$ of the power conversion device 100-2. The calculation unit 211 can calculate the total value $Z_1+Z_2$ of the value $Z_1$ of the impedance component 12-1 and the value $Z_2$ of the impedance component 12-2, from the values of these $V_{PV}$, $V_{BAT}$, $I_{PV}$ and $I_{BAT}$. The calculation unit 211 may also compare the impedance value $Z_1$ and $Z_2$, which are stored in the impedance information storage unit 224, while calculating the total value $Z_1+Z_2$. If the stored value has a difference equal to or greater than a predetermined threshold value when compared to the comparison result and the calculated total value $Z_1+Z_2$, the user may be informed. When the user is informed, the images of the power conversion device 100-1 and the power conversion device 100-2 may be highlighted, displayed in different colors, or blinked on the screen of the server 200.

Also, the contents of the control information may be different corresponding to the types of the distributed power sources 10-1 and 10-2. For example, when the distributed power source 10-1 is a photovoltaic power generation device, during the night, reactive power instructions that are different from each other may be transmitted to the power conversion device 100-1 and the power conversion device 100-2 as the control information, so that the injection amount of the reactive power from the power conversion device 100-1, which is connected to the photovoltaic power generation device, to the utility grid 2, is less than the injection amount of the reactive power in another power conversion device 100-2.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1: power generation system; 2: utility grid; 3: interconnection point; 10: distributed power source; 12: impedance component; 16: load; 20: grid power source; 100: power conversion device; 101: power conversion device; 110: control device; 111: calculation unit; 112: control unit; 113: reactive power regulator; 114: current sensor; 115: voltage sensor; 116: adjustment unit; 117: temperature information acquisition unit; 118: timing unit; 119: frequency measurement unit; 120: storage unit; 122: Volt-Var characteristic storage unit; 124: impedance information storage unit; 126: voltage offset storage unit; 130: power conversion unit; 132: inverter; 134: inverter control unit; 142: control unit; 144: difference unit; 200: server; 211: calculation unit; 212: control information calculation unit; 213: transmitting unit; 220: storage unit; 222: Volt-Var characteristic storage unit; 224: impedance information storage unit

What is claimed is:

1. A grid interconnection device for supplying power generated by a distributed power source to an interconnection point, comprising:
a calculation unit for calculating voltage at the interconnection point based on output voltage of the grid interconnection device, output current of the grid interconnection device, and an impedance component between the grid interconnection device and the interconnection point; and
a control unit for controlling output power from the grid interconnection device, based on voltage at the interconnection point calculated by the calculation unit.

2. The grid interconnection device according to claim 1, wherein
the impedance component includes an impedance component of a transformer, which is provided between the grid interconnection device and the interconnection point.

3. The grid interconnection device according to claim 1, wherein
the control unit is configured to control reactive power output from the grid interconnection device.

4. The grid interconnection device according to claim 3, wherein
the control unit is configured to adjust the output voltage by controlling reactive power output from the grid interconnection device.

5. The grid interconnection device according to claim 1, wherein
the calculation unit is configured to detect the output voltage of the grid interconnection device and the output current of the grid interconnection device for each control cycle, and calculate offset voltage between voltage at the interconnection point and the output voltage of the grid interconnection device.

6. The grid interconnection device according to claim 1, further comprising:
a temperature information acquisition unit for acquiring temperature information; wherein
the control unit is configured to further adjust the output power from the grid interconnection device based on the temperature information.

7. The grid interconnection device according to claim 1, wherein
the control unit is configured to further adjust the output power from the grid interconnection device based on the output voltage frequency.

8. The grid interconnection device according to claim 1, wherein
the control unit is configured to further adjust the output power from the grid interconnection device based on time from a start of operation of the grid interconnection device.

9. The grid interconnection device according to claim 1, wherein
the grid interconnection device is a power conversion device for converting power generated by a distributed power source into power corresponding to a utility grid.

10. The grid interconnection device according to claim 1, further comprising:
a storage unit for storing Volt-Var characteristic information, which is information showing a relationship between voltage at the interconnection point and reactive power Q to be output from the grid interconnection device, in the grid interconnection device; wherein
the control unit is configured to control output power from the grid interconnection device by determining an injection amount or an absorption amount of reactive power corresponding voltage at the interconnection point, which is calculated by the calculation unit, with reference to the Volt-Var characteristic information.

11. The grid interconnection device according to claim 10, wherein:
the Volt-Var characteristic information
has a ratio of reactive power to apparent power of 0% in a first region, where $Vo-d_{11} \leq V_{PCC} \leq Vo+d_{12}$ ($V_{PCC}$ is voltage at the interconnection point, Vo is rated voltage, and $d_{11}$ and $d_{12}$ are constants);

has an injection amount of reactive power increased as voltage at the interconnection point decreases in a second region, where $Vo-d_2 \leq V_{PCC} < Vo-d_{11}$ ($d_2$ is a constant, and $d_2 > d_{11}$);

has an absorption amount of reactive power increased as voltage at the interconnection point increases in a third region, where $Vo+d_{12} < V_{PCC} < Vo+d_3$ ($d_3$ is a constant, and $d_3 > d_{12}$).

12. The grid interconnection device according to claim 11, wherein an injection amount of reactive power is a constant in a region where $Vo-d_2 > V_{PCC}$, and an absorption amount of reactive power is a constant in a region where $Vo+d_3 < V_{PCC}$ according to the Volt-Var characteristic information.

13. The grid interconnection device according to claim 1, wherein the calculation unit is configured to detect the output voltage of the grid interconnection device and the output current of the grid interconnection device for each control cycle, and calculate offset voltage between voltage at the interconnection point that is a point where a plurality of distributed power sources are connected, and the output voltage of the grid interconnection device.

14. The grid interconnection device according to claim 1, wherein the calculation unit is configured to detect the output voltage of the grid interconnection device and output current of the grid interconnection device for each control cycle of 100 μsec or less, and calculate offset voltage between voltage at the interconnection point and the output voltage of the grid interconnection device.

15. A server that is communicatively connected to one or more grid interconnection devices for supplying power generated by a distributed power source to an interconnection point, comprising:

a calculation unit for calculating voltage at the interconnection point based on output voltage and output current of the one or more grid interconnection devices, and an impedance component between the one or more grid interconnection devices and the interconnection point;

a control information calculation unit for calculating control information in order to control output power of the one or more grid interconnection devices based on voltage at the interconnection point, which is calculated by the calculation unit; and a transmitting unit for transmitting the control information to the one or more grid interconnection devices.

16. The server according to claim 15, wherein the server is communicatively connected to a plurality of grid interconnection devices; and the control information calculated by the control information calculation unit is respectively different for each grid interconnection device.

17. The server according to claim 15, wherein the control information includes information about reactive power to be output from the one or more grid interconnection devices.

18. The server according to claim 17, wherein the control information includes information showing a relationship between the output voltage of the one or more grid interconnection devices, and the reactive power to be output from the one or more grid interconnection devices.

19. The server according to claim 15, wherein the impedance component includes an impedance component of a transformer provided between the grid interconnection device and the interconnection point.

20. The server according to claim 15, wherein the calculation unit is configured to detect the output voltage of the one or more grid interconnection devices and the output current of the one or more grid interconnection devices for each control cycle, and calculate offset voltage between voltage at the interconnection point and the output voltage of the grid interconnection device.

21. The server according to claim 15, wherein the calculation unit is configured to detect the output voltage of the one or more grid interconnection devices and the output current of the one or more grid interconnection devices for each control cycle of 100 μsec or less, and calculate offset voltage between voltage at the interconnection point and the output voltage of the grid interconnection device.

22. The server according to claim 18, wherein Volt-Var characteristic information, which is information indicating a relationship between the output voltage of the one or more grid interconnection devices and the reactive power to be output from the one or more grid interconnection devices:

has a ratio of reactive power to apparent power of 0% in a first region where $Vo-d_{11} \leq V_{PCC} \leq Vo+d_{12}$ (where $V_{PCC}$ is voltage at the interconnection point, $Vo$ is rated voltage, $d_{11}$ and $d_{12}$ are constants);

has an injection amount of reactive power increased as voltage at the interconnection point becomes lower in a second region where $Vo-d_2 \leq V_{PCC} \leq Vo-d_{11}$ (where $d_2$ is a constant, and $d_2 > d_{11}$); and has an absorption amount of reactive power increased as voltage at the interconnection point becomes higher in a third region where $Vo+d_{12} < V_{PCC} < Vo+d_3$ (where $d_3$ is a constant, and $d_3 > d_{12}$).

23. The server according to claim 22, wherein based on the Volt-Var characteristic information, in a region where $Vo-d_2 > V_{PCC}$, an injection amount of reactive power is constant, and in a region where $Vo+d_3 < V_{PCC}$, an absorption amount of reactive power is constant.

24. The server according to claim 18, wherein the control information calculation unit is configured to:

calculate reactive power to be output from the one or more grid interconnection devices based on the voltage at the interconnection point calculated by the calculation unit; and adjust information indicating a relationship between the output voltage of the one or more grid interconnection devices and the reactive power to be output from the one or more grid interconnection devices based on a result of comparing the reactive power that is calculated with the reactive power that is actually output by the one or more grid interconnection devices to a utility grid.

25. A power generation system, comprising:

one or more grid interconnection devices configured to supply power generated by a distributed power source to an interconnection point; and a server communicatively connected to the one or more grid interconnection devices, wherein the server comprises a calculation unit for calculating voltage at the interconnection point based on output voltage and output current of the one or more grid interconnection devices, and an impedance component between the one or more grid interconnection devices and the interconnection point;

a control information calculation unit for calculating control information in order to control output power of the one or more grid interconnection devices based on voltage at the interconnection point, which is calculated by the calculation unit; and a transmitting unit for transmitting the control information to the one or more grid interconnection devices; wherein the one or more grid interconnection devices comprise a control unit for controlling output power from the grid interconnection device, based on the control information.

* * * * *